US012626093B2

(12) United States Patent
Takahashi et al.

(10) Patent No.: US 12,626,093 B2
(45) Date of Patent: May 12, 2026

(54) COMPUTING APPARATUS

(71) Applicant: Hitachi, Ltd., Tokyo (JP)

(72) Inventors: Makoto Takahashi, Tokyo (JP);
Takashi Oshima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 544 days.

(21) Appl. No.: 18/223,722

(22) Filed: Jul. 19, 2023

(65) Prior Publication Data

US 2024/0086680 A1 Mar. 14, 2024

(30) Foreign Application Priority Data

Sep. 14, 2022 (JP) ................................. 2022-146070

(51) Int. Cl.
G06N 3/04 (2023.01)
G06N 3/08 (2023.01)
(52) U.S. Cl.
CPC ................. G06N 3/04 (2013.01); G06N 3/08 (2013.01)
(58) Field of Classification Search
CPC .......... G06N 3/04; G06N 3/045; G06N 3/063; G06N 3/08
See application file for complete search history.

(56) References Cited

U.S. PATENT DOCUMENTS

| | | | | |
|---|---|---|---|---|
| 11,586,889 | B1 * | 2/2023 | Gopalakrishnan | ..... G06N 3/063 |
| 11,709,783 | B1 * | 7/2023 | Chen | ...................... G06N 20/00 |
| | | | | 710/26 |
| 12,056,604 | B2 * | 8/2024 | Seshadri | .................. G06N 3/08 |
| 12,236,341 | B2 * | 2/2025 | Yan | ....................... G06N 3/0442 |
| 12,443,831 | B1 * | 10/2025 | Fan | ........................ G06N 3/063 |
| 2021/0004681 | A1 | 1/2021 | Tate et al. | |
| 2021/0158132 | A1 * | 5/2021 | Huynh | ................. G06N 3/0464 |
| 2021/0286654 | A1 | 9/2021 | Liu et al. | |
| 2021/0303909 | A1 * | 9/2021 | Gunnam | .............. G06N 3/0495 |
| 2022/0092408 | A1 * | 3/2022 | Khaitan | ................... G06N 3/09 |
| 2022/0147791 | A1 * | 5/2022 | Yao | ........................ G06N 3/084 |

(Continued)

FOREIGN PATENT DOCUMENTS

| | | |
|---|---|---|
| JP | 2021-9622 A | 1/2021 |

OTHER PUBLICATIONS

Zhou, L. et al., "Distributing Deep Neural Networks with Containerized Partitions at the Edge", 2nd USENIX Workshop on Hot Topics in Edge Computing, HotEdge (2019), https://www.usenix.org/system/files/hotedge19-paper-zhou.pdf (7 pages).

(Continued)

*Primary Examiner* — Gary S Gracia
(74) *Attorney, Agent, or Firm* — Crowell & Moring LLP

(57) ABSTRACT

A computing apparatus includes at least one computing device including a computation area. The computing apparatus acquires input information, generates a plurality of input feature maps from the input information, and performs DNN computation in parallel on the generated plurality of input feature maps by at least one DNN partitioning method including channel partitioning. In the channel partitioning, by grouping the feature maps into sets grouping the feature maps without partitioning the feature maps and allocating each set grouping the feature maps to each computation area, computation for layers is performed.

15 Claims, 18 Drawing Sheets

(56)          References Cited

U.S. PATENT DOCUMENTS

| | | | |
|---|---|---|---|
| 2023/0010085 A1* | 1/2023 | Wang | G06V 20/41 |
| 2023/0012843 A1* | 1/2023 | Komatsu | G06V 20/597 |
| 2023/0063221 A1* | 3/2023 | Marks | A61B 5/1176 |
| 2023/0097594 A1* | 3/2023 | Hirai | G06N 3/063 |
| | | | 706/27 |
| 2023/0214646 A1* | 7/2023 | Youn | G06N 3/082 |
| | | | 706/25 |
| 2023/0237770 A1* | 7/2023 | Sombatsiri | G06N 3/08 |
| | | | 382/190 |

OTHER PUBLICATIONS

Japanese-language Office Action issued in Japanese Application No. 2022-146070 dated Dec. 2, 2025 with English translation (6 pages).

* cited by examiner

INPUT CHANNEL (ch1 to ch32)
FILTER (f1 to f32)

MODEL LEVEL TABLE 161

| MODEL LEVEL L | (MODEL NAME, NUMBER OF DEVICES) |
|:---:|:---:|
| 1 | (MobileNetV2, 1) |
| 2 | (ResNet-34, 2) |
| 3 | (ResNet-50, 3) |
| 4 | (Inception-v3, 4) |
| . | . |
| . | . |
| . | . |

The column headers are labeled 1101 and 1102.

MODEL LEVEL DETERMINATION PROCESS

START

S1201

GENERATE UPDATE VALUE ΔL BASED ON CLASS PROBABILITY VALUE, UPPER THRESHOLD VALUE TH1, AND LOWER THRESHOLD VALUE TH2

S1202

OUTPUT UPDATE VALUE ΔL TO MODEL LEVEL UPDATING UNIT 150

END

PERIPHERAL ENVIRONMENT RECOGNITION PROCESS

START

S1501

PERFORM SPECTRUM ANALYSIS OF IMAGE DATA AND DETERMINE SPARSENESS AND DENSENESS OF IMAGE BASED ON ANALYSIS RESULT

S1502

OUTPUT MODEL LEVEL L SELECTED ON THE BASIS OF SPARSENESS AND DENSENESS OF IMAGE TO MODEL LEVEL UPDATING UNIT 150

END

Intensity

Ith fth

Frequency

FIG. 17C

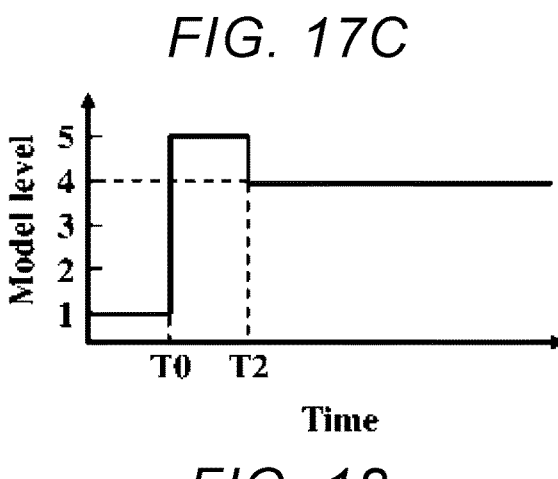

FIG. 18

CONFIGURATION INFORMATION STORAGE UNIT ~120

| CONFIGURA-TION INFORMATION L=1 | CONFIGURA-TION INFORMATION L=2 | CONFIGURA-TION INFORMATION L=3 | ... |

122a~122n

MODEL LEVEL UPDATING UNIT

MODEL LEVEL L

REGISTER MEMORY ~151

CONFIGURATION INFORMATION SELECTION UNIT (SELECTOR)

SELECT

SELECTOR ~152

SPARSENESS / DENSENESS SIGNAL

CONFIGURATION INFORMATION 200
160 150
140

PERIPHERAL ENVIRONMENT RECOGNITION UNIT ~170

DNN COMPUTATION EXECUTION UNIT ~110

COMPUTING DEVICE POWER SUPPLY UNIT ~130

500

INPUT INFORMATION

111x

111xa~111xn

CLASS PROBABILITY VALUE

L FORCE    ΔL

OUTPUT TH1,TH2

CLASS PROBABILITY VALUE

| CLASS PROBABILITY VALUE | LEVEL INCREASE / DECREASE VALUE ΔL |
|---|---|
| TH1~1 | -1 |
| TH2~TH1 | 0 |
| 0~TH2 | +1 |

141

MODEL LEVEL DETERMINATION UNIT

| MODEL LEVEL L | (MODEL NAME, NUMBER OF COMPUTATION AREAS) |
|---|---|
| 1 | (MobileNetV2, 1) |
| 2 | (ResNet-34, 2) |
| 3 | (ResNet-50, 3) |
| 4 | (Inception-v3, 4) |
| . . . | . . . |

COMPUTING APPARATUS

BACKGROUND OF THE INVENTION

1. Field of the Invention

The present invention relates to a computing apparatus performing deep neural network (DNN) computation.

2. Description of Related Art

As working population and skilled workers are declining, automation of various tasks has been promoted in the fields of logistics and production using artificial intelligence (AI) in robots and automatic guided vehicles (AGVs).

In such automation, it is important to operate a highly accurate image recognition AI with an edge device that can be equipped with a robot or an AGV. Herein, the robot and the AGV are required to be able to move quickly, and therefore, it is required that the AI mounted on the robot and the AGV can be computed at a high speed.

Deep neural network (DNN) is known as highly accurate image recognition AI. In the DNN, an image is analyzed by repeating convolution computation or the like on a feature map generated from the image. A unit of the computation is called a layer, and a size of the feature map and the number (number of channels) of the feature maps used for computation change depending on the layer. In general, in the DNN, in the first half of the computation network, the feature map is large in size and small in the number of channels, like the feature maps 1-1, 1-2, and 1-3 illustrated in an example of FIG. 1A. On the other hand, in the latter half of the computation network, the feature map is small in size and large in the number of channels, like the feature maps 2-1, 2-2, . . . , and 2-12 illustrated in FIG. 1B.

The large-scale DNN is required for highly accurate image analysis. Generally, in the large-scale DNN, the feature map is large in size and large in the number of channels. On the other hand, to perform a highly accurate image analysis, especially by edge devices with limited process power and memory capacity, there is known partitioned DNN which is a method of partitioning the feature map into the plurality of areas and allocating individual devices to each area. For example, Li Zhou, Hao Wen, Radu Teodorescu and David H. C. Du, et al., "Distributing Deep Neural Networks with Containerized Partitions at the Edge", 2nd USENIX Workshop on Hot Topics in Edge Computing, HotEdge (2019). https://www.usenix.org/system/files/hot-edge19-paper-zhou.pdf focuses mainly on a magnitude of the feature map size near an input layer in the partitioned DNN as illustrated in FIG. 2A and discloses a technique using spatial partitioning which is a method of partitioning an inside of each feature map which is a two-dimensional data into a plurality of areas. Herein, as an example of the spatial partitioning, FIG. 2A illustrates a case where each of the feature map 1-1, 1-2, and 1-3 is partitioned into four areas, and each area is partitioned into a total of four edge devices 1, 2, 3, and 4.

SUMMARY OF THE INVENTION

However, as illustrated in FIG. 1B, the size of the feature map is reduced in the latter half of a DNN computation network. Therefore, in the spatial partitioning, there is a problem that computational efficiency decreases in the latter half of the DNN computation network. There is a problem that a large amount of memory is required for large-scale DNN computations. In such partitioned DNN, since it is necessary to operate the plurality of edge computing devices, there is a problem that power consumption may increase. Therefore, there is a demand for the computing apparatus capable of appropriately performing the DNN computation.

Accordingly, the invention is to provide a computing apparatus capable of appropriately performing DNN computation.

According to an aspect of a computing apparatus of the invention, there is provided a computing apparatus including at least one computing device including at least one computation area for performing computation, the computing apparatus performing deep neural network (DNN) computation by using the computing device, the computing device including an intermediate memory area, the computing apparatus including: a plurality of the computation areas; and a DNN computation execution unit acquiring input information, generating a plurality of input feature maps from the input information, transmitting the generated plurality of input feature maps to the computing device to be used in the computation among the computing devices, and performing DNN computation on the plurality of input feature maps in parallel by using the plurality of computation area, in which the DNN computation execution unit performs the DNN computation in parallel on the plurality of input feature maps in at least one DNN partitioning method, in the DNN partitioning method when performing the DNN computation in parallel includes at least channel partitioning, in which, in the process of DNN computation, (1) without partitioning each of the plurality of feature maps to be used in the computation for the layer, the plurality of feature maps to be used in the computation for the layer are grouped into sets grouping the feature maps and (2) the computation for the layer is performed on each set grouping the feature maps, and when performing at least the channel partitioning, the computation is performed by storing a result of performing the computation on the feature map or the feature map included in at least one of the different computation areas in the intermediate memory area included in at least another one of the computation areas.

According to another aspect of a computing apparatus of the invention, there is provided a computing apparatus including at least one computing device including at least one computation area for performing computation, the computing apparatus performing deep neural network (DNN) computation by using the computing device, in which the computing apparatus including: a plurality of the computation areas; and a DNN computation execution unit acquiring input information, generating a plurality of input feature maps from the input information, transmitting the generated plurality of input feature maps to the computing device to be used in the computation among the computing devices, and performing DNN computation on the plurality of input feature maps in parallel by using the plurality of computation area, in which in a process of the DNN computation, the DNN computation execution unit switches a partitioning method between: spatial partitioning in which the feature map partitioned into a plurality of the feature maps inside a plane, each of the partitioned feature maps is allocated to each of the plurality of computation areas, and the computation is performed for the layer; and channel partitioning in which (1) without partitioning each of the plurality of feature maps used in the computation for the layer, the plurality of feature maps to be used in the computation for the layer are grouped into sets grouping the feature maps, and (2) each set grouping the feature maps to each computation area to be used among the plurality of computation areas.

According to a further aspect of a computing apparatus of the invention, there is provided a computing apparatus including at least one computing device including at least one computation area for performing computation, the computing apparatus performing deep neural network (DNN) computation by using a computing device, the computing apparatus including: a plurality of the computation areas; a DNN computation execution unit acquiring input information, generating a plurality of input feature maps from the input information, transmitting the generated plurality of input feature maps to the computing device to be used in the computation among the computing devices, and performing computation of the DNN model on the plurality of input feature maps in parallel by using the plurality of computation area, and calculating output information including the accuracy value of the computation result as the computation result of the DNN model; and a model adjustment unit determining applicability of the DNN model based on the accuracy value included in the output information and information on the computation scale of the DNN model and calculating model level information specifying the DNN model and the number of computation areas to be used in the DNN calculation for the plurality of input feature maps generated from the input information to be input next, in which the DNN computation execution unit changes the DNN model and the number of computation areas to be used in the DNN computation for the plurality of input feature maps generated from the input information to be input next based on the model level information calculated by the model adjustment unit.

According to the invention, a computing apparatus can appropriately perform DNN computation.

Problems, configurations, and effects other than those described above will be clarified by the following description of modes for carrying out the invention.

BRIEF DESCRIPTION OF THE DRAWINGS

FIG. 17C is a diagram illustrating an example of a time chart of model level L update of the computing apparatus of the fifth embodiment with feedforward control of the fifth embodiment;

FIG. 18 is a diagram illustrating an example of a functional block diagram of a computing apparatus of a sixth embodiment;

FIG. 19 is a diagram illustrating an example of a model level table of the sixth embodiment.

DESCRIPTION OF EMBODIMENTS

Figure 1A:
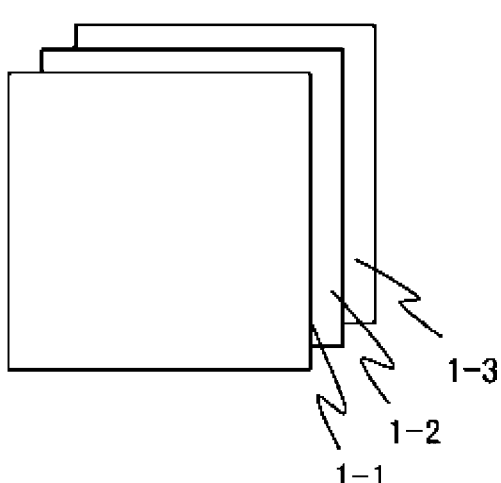
FIG. 1A is a diagram illustrating a size and number of channels of a feature map of a typical DNN.
Figure 1B:
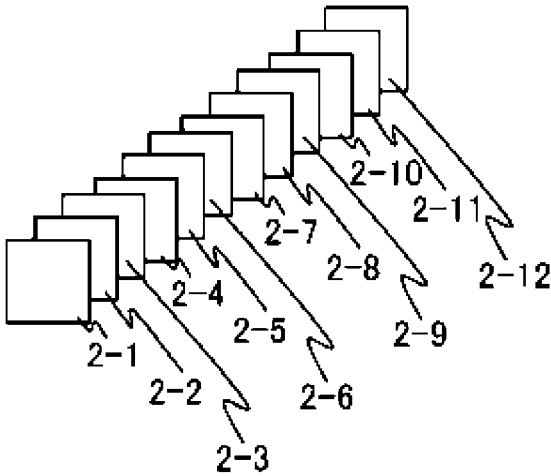
FIG. 1B is a diagram illustrating the size and number of the channels of the feature map of the typical DNN.

Hereinafter, embodiments of the invention will be described with reference to the drawings. The embodiments are exemplifications for explaining the invention and are appropriately omitted and simplified for clarity of explanation. The invention can also be implemented in various forms. Unless otherwise specified, each component may be singular or plural.

The position, size, shape, range, and the like of each component illustrated in the drawings may not represent the actual position, size, shape, range, and the like to facilitate understanding of the invention. Therefore, the invention is not necessarily limited to the position, size, shape, range, and the like, disclosed in the drawings.

Examples of various types of information are described by using expressions such as a "table", a "list", and a "queue", but various types of information may be expressed in data structures other than such expressions. For example, various types of information such as an "XX table", an "XX list", and an "XX queue" may be referred to as "XX information". When describing identification information, expressions such as "identification information", "identifier", "name", "ID", and "number" are used, but such expressions can be replaced with each other.

When there are a plurality of components having the same or similar functions, the components may be denoted by the same reference numerals and different suffixes. When there is no need to distinguish between the components, the suffixes may be omitted in the description.

First Embodiment

A computing apparatus 1 of a first embodiment analyzes input image data from a camera by performing a parallel process using a plurality of computing devices for deep neural network (DNN) computation including a plurality of layers and outputs the analysis result. Herein, the computing apparatus 1 switches a partitioning method from spatial partitioning to channel partitioning during the DNN computation. Note that the data input to the computing apparatus 1 may be data that can be processed by DNN computation and may be data other than image data.

Figure 3:
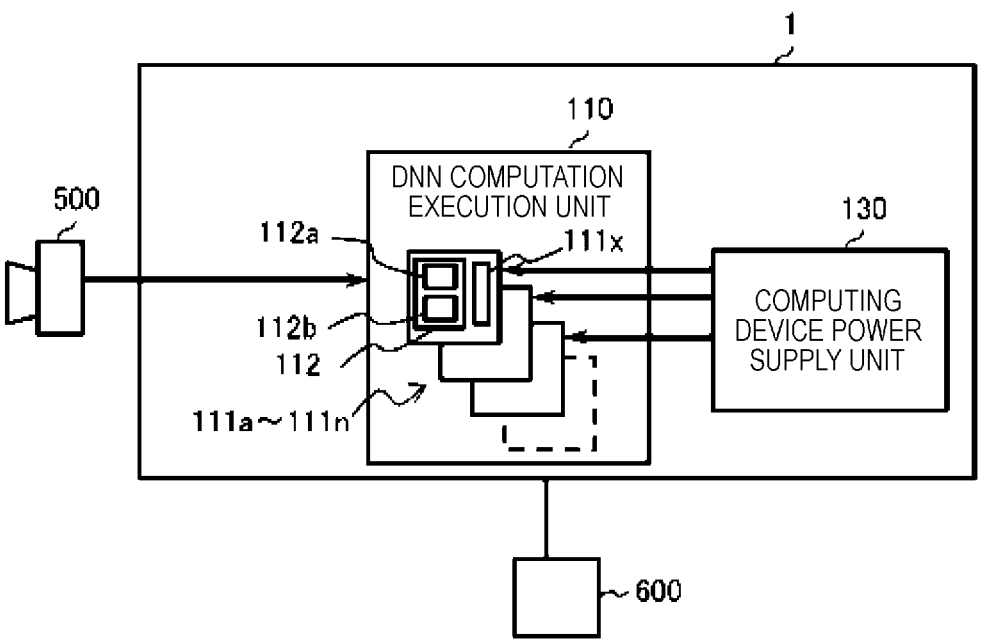
FIG. 3 is a diagram illustrating an example of a functional block diagram of a computing apparatus according to a first embodiment.
Figure 4:
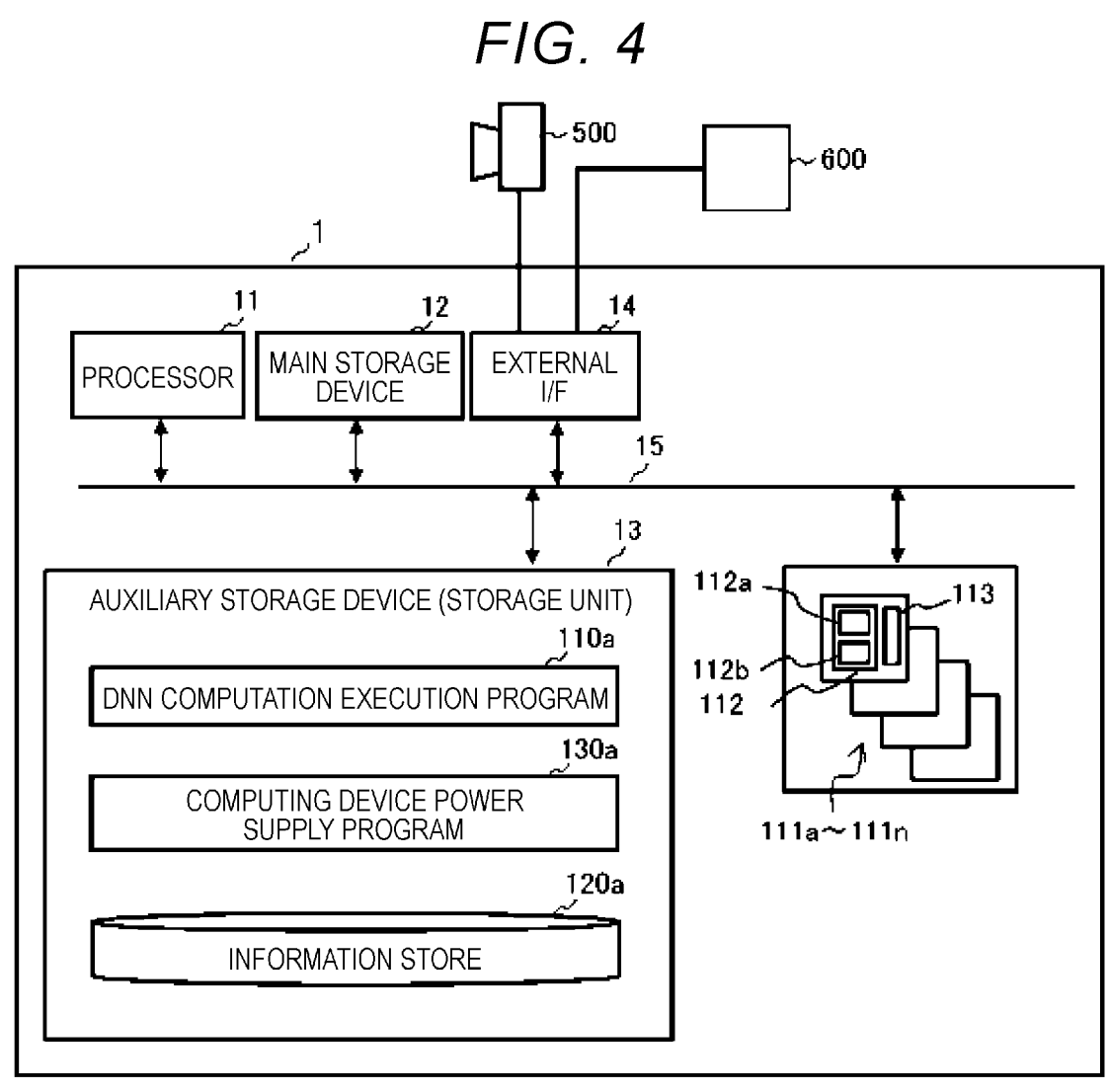
FIG. 4 is a diagram illustrating an example of a hardware/software configuration diagram of the computing apparatus according to the first embodiment.

<Configuration of Computing Apparatus 1, FIGS. 3 and 4>

FIG. 3 is a diagram illustrating an example of a functional configuration diagram of the computing apparatus 1. FIG. 4 is a diagram illustrating an example of a hardware/software configuration diagram of the computing apparatus 1.

As illustrated in FIG. 3, the computing apparatus 1 includes a DNN computation execution unit 110 including computing devices 111a to 111n and a computing device power supply unit 130 as functional configurations. The computing apparatus 1 is connected to a camera 500 and acquires image data from the camera 500. The image data is an example of input information input to the computing apparatus. The computing apparatus 1 is also connected to an external device 600. The computing apparatus 1 performs DNN computation on the image data (input information) input from the camera 500 in parallel by using the plurality of computing devices 111a to 111n and outputs the computation results to the external device 600.

As illustrated in FIG. 4, the computing apparatus 1 includes a processor 11, a main storage device 12, an auxiliary storage device 13, an external I/F 14, a bus 15 connecting the components, computing devices 111a to 111n, and the like, as hardware configurations.

The processor 11 controls each component of the computing apparatus 1, reads the data and programs stored in the auxiliary storage device 13 to the main storage device 12, and executes processes defined by the programs. The DNN computation execution unit 110 is implemented by the processor 11 reading out a DNN computation execution program 110a stored in the auxiliary storage device 13 to the main storage device 12, executing the DNN computation execution program 110a, and allowing the computing devices 111a to 111n to perform computation. The computing device power supply unit 130 is implemented by the processor 11 reading out a computing device power supply program 130a stored in the auxiliary storage device 13 to the main storage device 12 and executing the computing device power supply program 130a. In the specification, when processes are described with sentences having the DNN computation execution unit 110 and the computing device power supply unit 130 as the subjects, the sentences indicate that the processor 11 of the computing apparatus 1 executes the DNN computation execution program 110a and the computing device power supply program 130a implementing the corresponding functional units.

Specifically, the processor 11 performs, for example, a process such as image capturing of the image data input from the camera 500, storing and reading the data in the main storage device 12 and the auxiliary storage device 13, format conversion of the image data, and resizing and filtering the image as necessary in a pre-process of generating an input channel described later and appropriately performs a post-process such as DNN computation of the output to the external device 600 or the like.

The main storage device 12 is a RAM or the like, includes a volatile memory element, and stores the programs executed by the processor 11 and data.

The auxiliary storage device 13 is a hard disk drive (HDD), a solid state drive (SSD), or the like and is a device including a non-volatile memory element and stores programs, data, and the like. The auxiliary storage device 13 stores the DNN computation execution program 110a, the computing device power supply program 130a, and a model information store 120a. Herein, the DNN computation execution program 110a and the computing device power supply program 130a are installed in the auxiliary storage device 13.

Each of the computing devices 111a to 111n includes a memory 112 including a computation memory area 112a for storing information to be used in the computation and a plurality of intermediate memory areas 112b for storing feature maps to be described later, and a computation area 113 for performing computation. The computing devices 111a to 111n are, for example, field programmable gate arrays (FPGAs). The computing devices 111a to 111n may be dedicated circuits such as application specific integrated circuits (ASICs), may be central processing units (CPUs), or may be graphics processing units (CPUs).

The memory 112 includes the intermediate memory areas 112b of which the number is the same as the number of computing devices among the computing devices 111a to 111n. One intermediate memory area 112b can store the feature map produced by one computing device. Thus, each of the computing devices 111a to 111n can receive and store the feature maps generated by the computing devices 111a to 111n.

The external I/F 14 is an interface capable of transmitting and receiving data to and from the camera 500 and the external device 600. The computing apparatus 1 can transmit and receive data to and from the camera 500 and the external device 600 via the external I/F 14.

The DNN computation execution unit 110 reads out the DNN model information stored in the model information store 120a and stores the DNN model information in the main storage device 12. Then, when image information (input information) is input from the camera 500, pre-process such as spatial partitioning is performed on the image information to generate an input feature map. The DNN computation execution unit 110 transmits information specifying the plurality of computing devices to be used in the computation among the computing devices 111a to 111n to the computing device power supply unit 130. The computing device power supply unit 130 supplies power to the plurality of computing devices to be used in the computation among the computing devices 111a to 111n based on the received information specifying the plurality of computing devices to be used in the computation. Herein, power consumption can be reduced by reducing power supply to the computing device that is not to be used in the computation.

In the embodiment, the DNN computation is performed by using all of the computing devices 111a to 111n.

The DNN computation execution unit 110 transmits the input feature map and the information for executing the DNN computation based on the information of the DNN model read from the model information store 120a to the computing device to be used in the computation among the computing devices 111a to 111n. Then, among the computing devices 111a to 111n, the plurality of computing devices to be used in the computation perform the DNN computation in parallel based on the input feature map and the information on the execution of the DNN computation based on the DNN model information.

Herein, the computing apparatus 1 partitions the image data and performs the DNN computation. The computing apparatus 1 switches the partitioning method from the spatial partitioning to the channel partitioning during the DNN computation.

As described below, the spatial partitioning is a partitioning method which performs the computations for the layers separately for the respective partitioned feature maps by partitioning the feature maps into a plurality of feature maps inside the plane. On the other hand, the channel partitioning is a partitioning method which performs the computation for the layer by grouping the plurality of feature maps to be used in the computation for the layer into sets grouping the feature maps without partitioning each of the plurality of feature maps to be used in the computation for the layer and allocating each set grouping the partitioned feature maps to each of the computation areas to be used in the computation among the plurality of computation areas. The number of partitions is the number of computing devices to be used in the computation.

<About DNN Computation>

The computing apparatus 1 partitions the input feature maps generated from the image data inside the plane, performs the DNN computation by the spatial partitioning, and further switches the division method from the spatial partitioning to the channel partitioning.

The spatial partitioning is described above with reference to FIG. 2A. The spatial partitioning is a partitioning method which performs the computations for the layers separately for the respective partitioned feature maps by partitioning the feature maps into a plurality of feature maps inside the plane. In the example of the spatial partitioning in FIG. 2A described above, each inside of the planes of feature maps 1-1, 1-2, and 1-3 is partitioned into four sets, the partitioned sets of partitioning feature maps 3-1, 3-2, 3-3, and 3-4 are allocated to computing devices D1, D2, D3, and D4, respectively. The feature maps 1-1, 1-2, and 1-3 are, for example, the feature maps derived from R, G, and B image data.

Figure 2A:
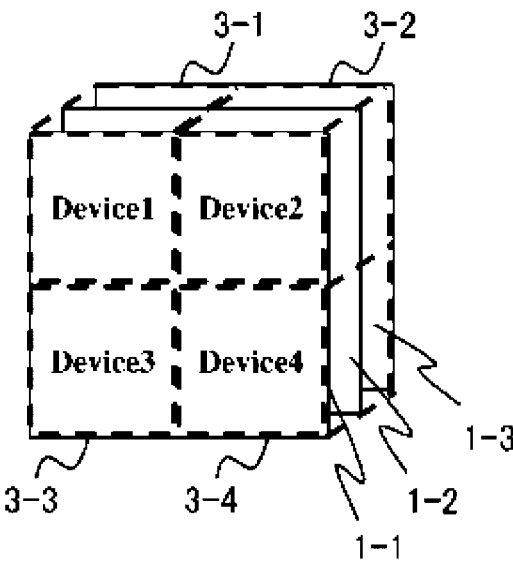
FIG. 2A is a diagram illustrating spatial partitioning in DNN computation.

In FIG. 2A, for example, the process for the partitioned feature map of the upper left portion of each of the feature maps 1-1, 1-2, and 1-3 is allocated to the computing device D1. The process for the partitioned feature map in the upper right portion of each of the feature maps 1-1, 1-2, and 1-3 is allocated to the computing device D2. As such, by allocating the feature maps 1-1 to 1-3 to the total number "4" of computing devices and performing parallel processes, the computation of the image analysis model can be performed at a higher speed.

Even when the size of the input image data is larger than the capacity of the memory 112 of the computing devices 111a to 111n, the computing apparatus 1 of the embodiment can generates the input feature maps from the image data (input data) by the spatial partitioning and processes each of the feature maps generated by partitioning the generated input feature maps by each of the computing devices 111a to 111n. As such, the computing apparatus 1 can perform the DNN computation at a higher speed even for large-sized image data (input information) by performing the model computation in parallel by the spatial partitioning.

In general, in the DNN computation, the number of feature maps increases as the computation progresses. Therefore, with only the spatial partitioning, the feature map is subpartitioned as the DNN computation progresses, and a use efficiency of the computing device decreases. Herein, the decrease in computational efficiency denotes the decrease in the use efficiency of computation units such as the computing devices 111a to 111n. Therefore, the computing apparatus 1 switches the partitioning method from the spatial partitioning to the channel partitioning.

Figure 2B:
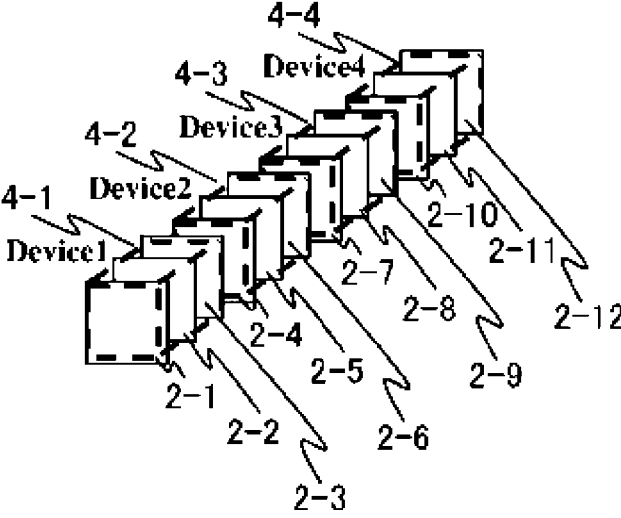
FIG. 2B is a diagram illustrating channel partitioning in DNN computation.

FIG. 2B is a diagram illustrating the channel partitioning in the DNN computation. In the example illustrated in FIG. 2B, the computing apparatus 1 partitions the 12 feature maps 2-1, 2-2, . . . , and 2-12 into sets of the feature maps by four-partitioning, namely, partitions the 12 feature maps 2-1, 2-2, . . . , and 2-12 into sets of the three feature maps (one set includes the three feature maps). Then, the computing apparatus 1 allocates each of the partitioned three sets of the feature maps to the edge devices 4-1, 4-2, 4-3, and 4-4. Then, the computing apparatus 1 switches from the spatial partitioning to the channel partitioning, as described below.

Figure 2C:
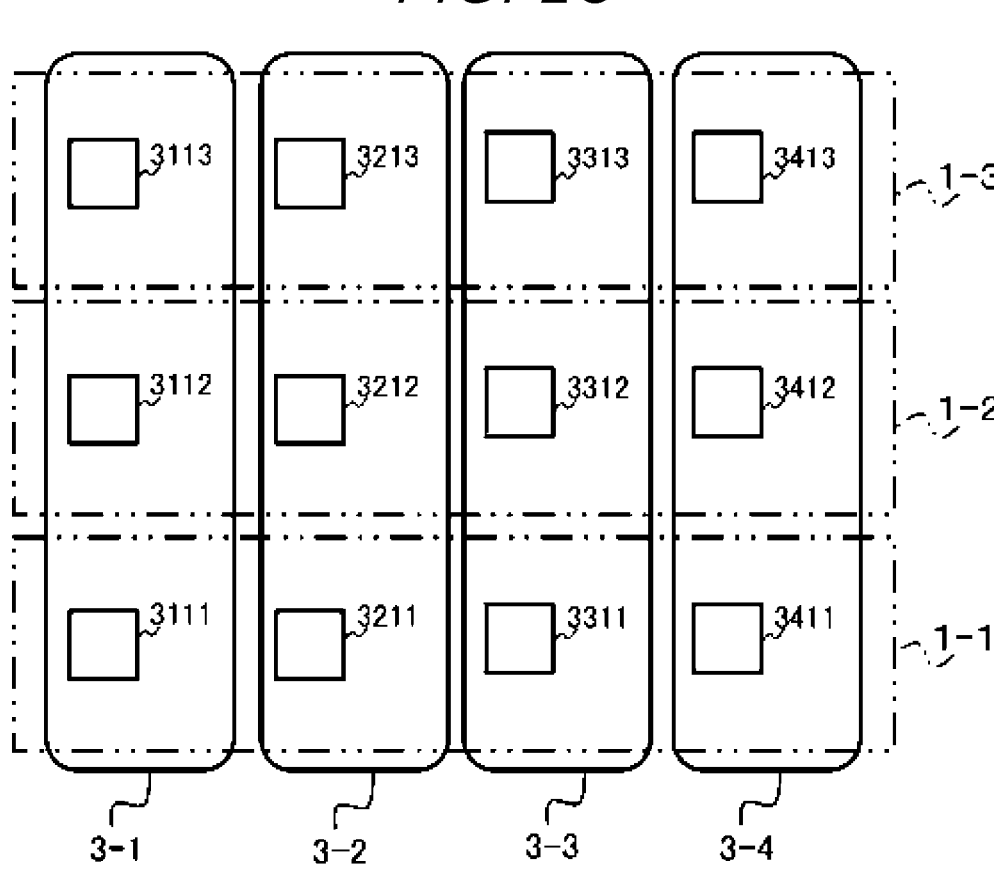
FIG. 2C is an explanatory diagram illustrating switching of a partitioning method from the spatial partitioning to the channel partitioning.

FIG. 2C is an explanatory diagram illustrating switching of the partitioning method from the spatial partitioning to the channel partitioning. In FIG. 2C, the feature maps 3111, 3112, and 3113 surrounded by a solid-line frame 3-1 are the feature maps output by the computing device D1 in the spatial partitioning method described above with reference to FIG. 2A. That is, the computing device D1 generates the feature map 3111 surrounded by the solid-line frame 3-1 in FIG. 2C by performing layer computation from the upper left portion of the feature map 1-1 in FIG. 2A. Herein, the size of the feature map 3111 in FIG. 2C is smaller than the size of the upper left portion of the feature map 1-1 in FIG. 2A. Similarly, the computing device D1 generates the feature map 3112 surrounded by the solid-line frame 3-1 in FIG. 2C from the upper left portion of the feature map 1-2 in FIG. 2A. The computing device D1 generates the feature map 3113 surrounded by the solid-line frame 3-1 in FIG. 2C from the upper left portion of the feature map 1-3 in FIG. 2A.

Similarly to the above description, in FIG. 2C, the feature map surrounded by a solid line frame 3-2 is the feature map output by the computing device D2 from the upper right portion of the feature maps 1-1, 1-2, and 1-3 in FIG. 2A described above with reference to FIG. 2A. Similarly, in FIG. 2C, the feature map surrounded by the solid line frame 3-3 is the feature map output from the lower left portion of the feature maps 1-1, 1-2, and 1-3 in FIG. 2A described above with reference to FIG. 2A by the computing apparatus 3, and the feature map surrounded by a solid line frame 3-4 is the feature map output from the lower right of the feature maps 1-1, 1-2, and 1-3 in FIG. 2A described above with reference to FIG. 2A by the computing device D4. Similarly, in FIG. 2C, the method of partitioning by the solid-line frames 3-1, 3-2, 3-3, and 3-4 is the spatial partitioning.

In FIG. 2C, the feature maps 3111, 3211, 3311, and 3411 surrounded by a two-dot chain line frame 1-1 are the feature maps (partitioned feature maps) generated from the feature map 1-1 in FIG. 2A. Similarly, the plurality of feature maps surrounded by a two-dot chain line frame 1-2 are the plurality of feature maps (partitioned feature maps) generated from the feature map 1-2 in FIG. 2A. The plurality of the feature map surrounded by a two-dot chain line frame 1-3 are the feature maps (partitioned feature maps) generated from the feature map 1-3 in FIG. 2A. In FIG. 2C, the method of partitioning by the two-dot chain line frames 1-1, 1-2, and 1-3 is the channel partitioning. As described above, as such, the channel partitioning is a partitioning method which performs the computation for the layer by grouping the plurality of feature maps to be used in the computation for the layer into sets grouping the feature maps without partitioning each of the plurality of feature maps to be used in the computation for the layer and allocating each set grouping the partitioned feature maps to each of the computation areas to be used in the computation among the plurality of computation areas.

Herein, when switching the partitioning method from the spatial partitioning to the channel partitioning, the allocation of the feature maps to the computing devices is changed. For example, in the example of FIG. 2C, during the spatial partitioning, the feature map surrounded by the solid-line frame 3-1 in FIG. 2C is allocated to the computing device D1, and after switching to the channel partitioning, the feature map surrounded by the two-dot chain frame 1-1 is allocated to the computing device D1. Herein, when switching the partitioning method from the spatial partitioning to the channel partitioning, for example, the feature maps (partitioned feature maps) of which allocation is changed such as the feature map 3112 is transmitted from the computing device allocated before the change to the inter-mediate memory areas of the computing devices to be allocated after the change and is stored in the intermediate memory areas.

The computing apparatus 1 can switch the partitioning method from the spatial partitioning to the channel partitioning between the layers. Conversely, the computing apparatus 1 can switch the partitioning method from the channel partitioning to the spatial partitioning between the layers. Herein, the layer immediately after switching the partitioning method is referred to as a switching layer. For example, the DNN computation execution unit 110 switches the partitioning method of the computation of the model for the input channel from the spatial partitioning to the channel partitioning before at least one switching layer during the computation and performs the computations after the switching layer in the plurality of computing devices 111a to 111n.

The switching layer is a layer selected from the layers possessed by the model based on the process speeds of the plurality of computing devices, the number of computing devices among the computing devices 111a to 111n, the capacity of the memory 112 of the computing devices, the size of the feature map input to the layer, the communication speed of the communication between the computing devices, or the like. One or more switching layers may be provided, and a plurality of the switching layers may be provided.

Effect of First Embodiment

In general, in the DNN computation, the number of feature maps increases as the computation progresses.

Therefore, with only the spatial partitioning, the feature map is subpartitioned as the DNN computation progresses, and the use efficiency of the computing device decreases. By switching between the spatial partitioning and the channel partitioning during the DNN computation, the computing apparatus 1 can prevent the feature map from being subpartitioned and the use efficiency of the computing device from decreasing. Accordingly, the computing apparatus 1 can appropriately perform the DNN computation in terms of high speed. Then, the computing apparatus 1 can perform an advanced image analysis by AI and can facilitate automation using the image analysis.

The computing apparatus 1 switches the partitioning method between the spatial partitioning and the channel partitioning before the layer selected from the layers having the DNN computation based on at least one of the process speed of the plurality of computing devices, the number of computing devices among the computing devices 111a to 111n (a plurality of the computing devices), the number of computation areas 113, and the capacity of the computation memory of the computing devices 111a to 111n (a plurality of the computing devices). Accordingly, the computing apparatus 1 can more appropriately switch between the spatial partitioning and the channel partitioning. Accordingly, the computing apparatus 1 can more reliably perform the DNN computation favorably in terms of high speed.

Each of the computing devices 111a to 111n (the plurality of computing devices) includes intermediate memory areas of which the number is the number of computation areas 113 included by the computing devices 111a to 111n (the plurality of computing devices) (herein, the same number of computing devices as the computing devices 111a to 111n). Accordingly, each of the computing devices 111a to 111n can reliably store the feature map transmitted from the other computing device through communication between the computing devices in the intermediate memory area. Accordingly, the computing apparatus 1 can more reliably perform DNN computation.

Second Embodiment

A computing apparatus 2 of a second embodiment performs specific processes in channel partitioning. The computing apparatus 2 of the second embodiment has the same functional units, hardware configuration, and software configuration as those the computing apparatus 1 of the first embodiment. Therefore, descriptions of the functional units, hardware configuration, and software configuration of the computing apparatus 2 of the second embodiment are omitted.

To describe the embodiment, first, Comparative Example 1, which is an example of the computation procedure when no partitioning is performed in the DNN computation, will be described with reference to FIG. 5. Next, Comparative Example 2, which is an example of the computation procedure when channel partitioning in the related art is performed in the DNN computation, will be described with reference to FIG. 6. Finally, a computation procedure when the channel partitioning of the embodiment is performed in the DNN computation will be described with reference to FIG. 7.

In the following description of Comparative Example 1, Comparative Example 2, and the embodiment, the simplified example will be used to facilitate understanding of the description. That is, in the following description of Comparative Example 1, Comparative Example 2, and the embodiment, the computation for the convolution layer with 32 input channels and 32 input feature map is described, and the description of the computation of the other layers is omitted. The reason why the computation for the convolution layer is explained herein is that the explanation of the computation method of the computation for the convolution layer facilitates understanding of the features of the computation method of the DNN of the embodiment.

In the example of the convolution layer described below, one filter is used for the input feature map for each input channel. That is, in the convolution layer, 32 different filters are used for 32 different input feature map to generate 32 convolution maps. The feature map generated by summing the elements of the 32 convolution maps is used as an output feature map of an output channel. Additional computation is performed from the output channels as necessary to generate data at the output of the DNN computation. In some cases, the output data may include, for example, a value (class probability value) of class probability representing the accuracy of the computation result. In the specification, accuracy denotes a degree of correctness of the result of the DNN computation. In the specification, the accuracy does not denote the number of digits of data in the output of the DNN computations.

Figure 5:
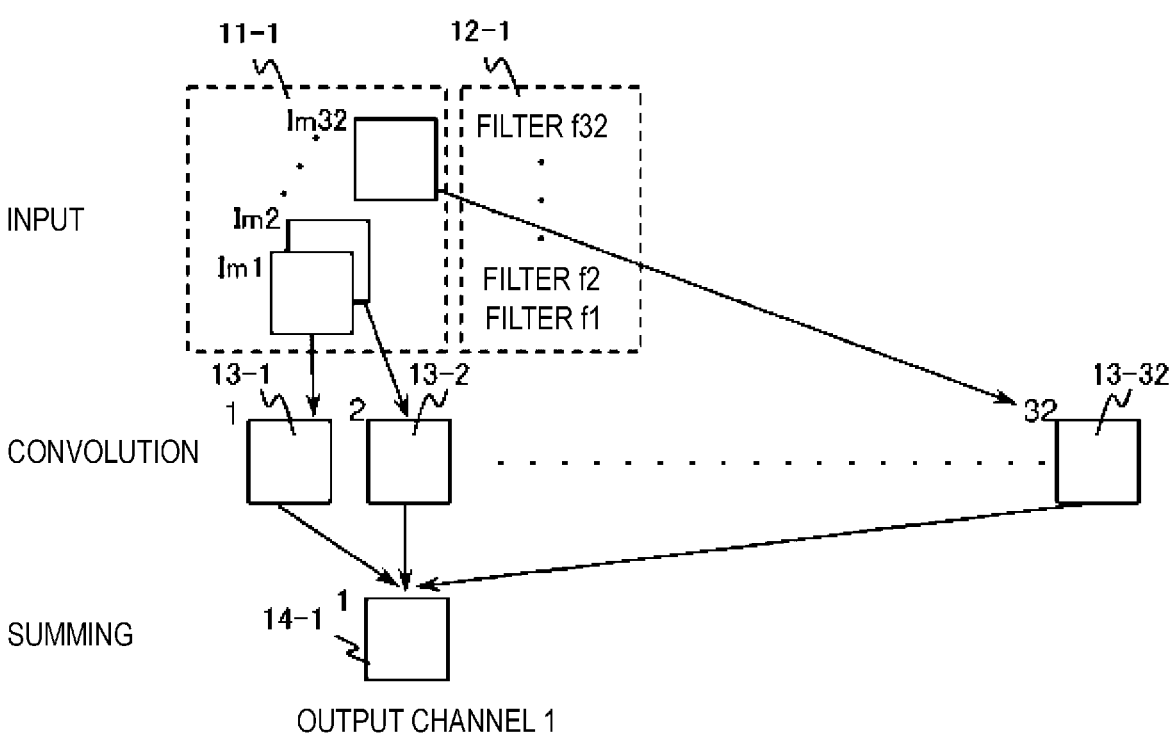
FIG. 5 is a diagram illustrating an example of a computation procedure when partitioning is not performed in DNN computation according to Comparative Example 1.
Figure 6:
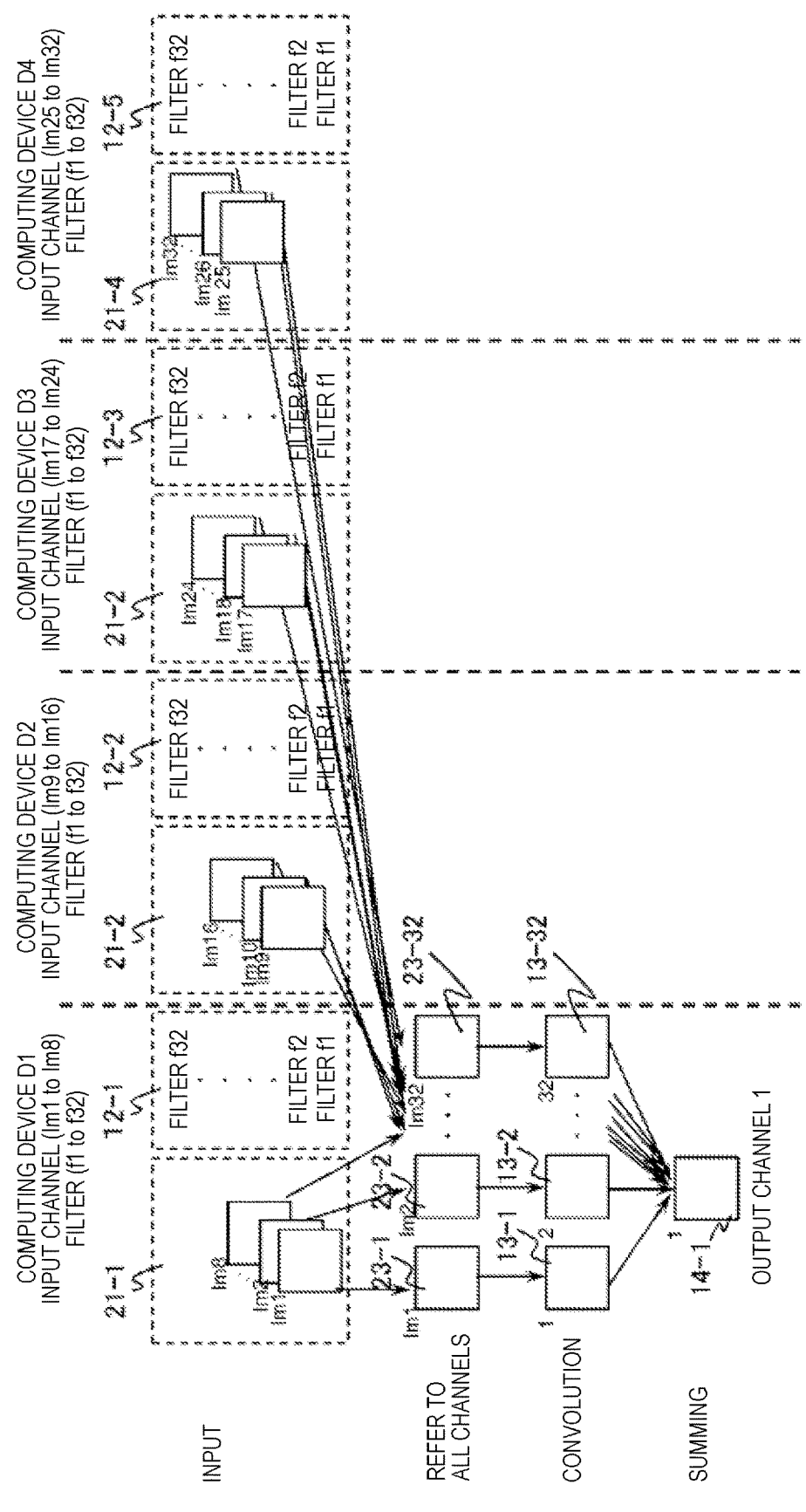
FIG. 6 is a diagram illustrating an example of a computation procedure when channel partitioning in the related art is performed in DNN computation according to Comparative Example 2.
Figure 7:
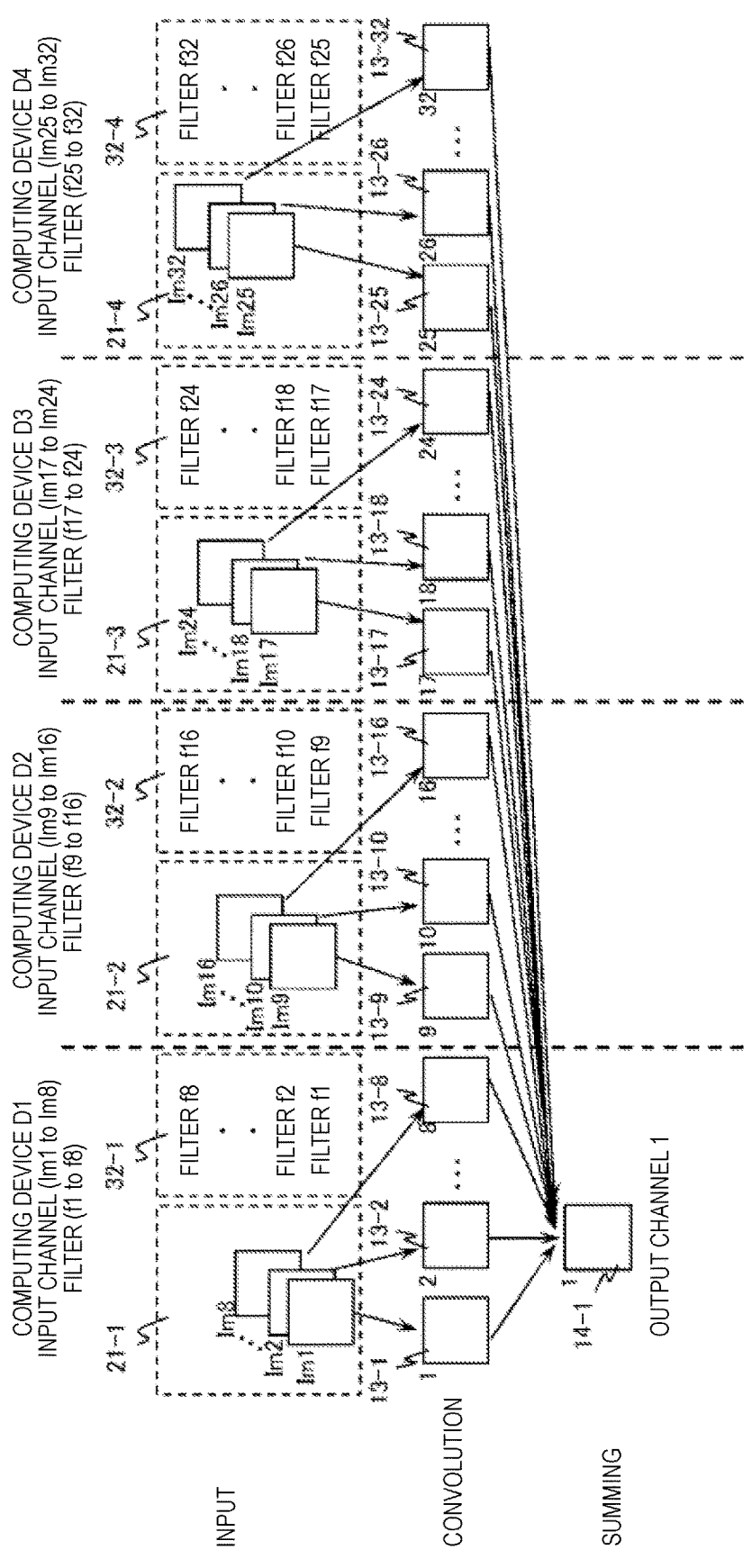
FIG. 7 is a diagram illustrating an example of a computation procedure when channel partitioning is performed in DNN computation according to a second embodiment.

Note that FIGS. 5 to 7 illustrate a procedure for generating the output feature map for one channel. In Comparative Example 1, Comparative Example 2, and the embodiment, the output feature map of each of a plurality of the output channels is generated.

Comparative Example 1: Computation Procedure without Partitioning, FIG. 5

FIG. 5 is a diagram illustrating an example of a computation procedure when partitioning is not performed in the DNN computation of Comparative Example 1. In the example illustrated in FIG. 5, the input includes an input channel 11-1 containing the total number "32" of input feature maps Im1, Im2, . . . , and Im32 and a filter 12-1 containing the total number "32" of different filters f1, f2, . . . , and f32.

In the convolution layer, first, the convolution computation is performed on each of the 32 input feature maps Im included in the input channel 11-1 by a filter f of the corresponding filter 12-1. That is, in the convolution computation, by superimposing the corresponding filter f on the corresponding input feature map Im and obtaining products for respective cells, the sum of the products is set as an element of the convolution map. By two-dimensionally moving the filter on the input feature map by a predetermined amount of movement (stride) and taking the sum, the obtained value is set as another element of the convolution map. The computation is performed repeatedly to generate one convolution map. Such convolution computation is performed on each of the 32 sets of input feature map Im and filters f to generate convolution maps 13-1, 13-2, . . . , and 13-32. The total number 32 of convolution maps 13-1, 13-2, and 13-32 is the same as the total number "32" of input channels as illustrated in FIG. 4.

Finally, in the computation for the convolution layer, one output feature map is generated by summing the elements of the convolution maps 13-1, 13-2, . . . , and 13-32. An output feature map 14-1 is an output channel 1.

As described above, generating one output feature map for one output channel requires the total number "32" of convolution maps generated from the input feature map. In the above description, the process of generating the feature map for one output of one output channel is described, but in Comparative Example 1, the plurality of feature maps for the plurality of output channels are generated by executing a plurality of processes similar to those described above.

Comparative Example 2: Calculation Procedure when Partitioning by Channel Partitioning in the Related Art, FIG. 6

FIG. 6 is a diagram illustrating an example of a computation procedure when channel partitioning in the related art is performed in the DNN computation of Comparative Example 2. In FIG. 6, configurations and data similarly to the configurations and data illustrated in FIG. 5 are denoted the same reference numerals as those of the configurations and data illustrated in FIG. 5.

In Comparative Example 2, the output feature map is generated for each of the plurality of output channels. However, the example illustrated in FIG. 6 illustrates the procedure for generating the feature map for one channel output, similarly to the example illustrated in FIG. 5. In the example illustrated in FIG. 6, the number of input channels and the number of input feature map are set to 32, and the number of computing devices to be used in the computation and the number of channel partitions are set to 4.

First, for each computing device, the eight input feature maps Im obtained by partitioning the total number "32" of input feature maps (input channels) Im by the number "4" of computing devices are allocated to each computing device. That is, one of the input channels 21-1, 21-2, 21-3, and 21-4 including the eight input feature maps Im is transmitted and input to each of the computing devices D1 to D4. Accordingly, the memory capacity required for storing the input feature map in each computing device can be reduced to 1/(the number of computing devices) of the memory capacity without partitioning of Comparative Example 1 illustrated in FIG. 5.

The total number "32" of filters f1, f2, . . . f32 corresponding to the total number "32" of all input feature maps are transmitted and input to each of the computing devices D1 to D4.

Then, as described above, to generate the output feature map in the convolution layer by summing the generated total number "32" of convolution maps, the computing device is required to input the total number "32" of convolution maps generated in the convolution layer as an input of the computation generating the output feature map from the convolution map.

The computing devices D2, D3, and D4 transmit all the input feature maps (input feature maps Im9 to Im32) to the computing device D1. Accordingly, the computing device D1 acquires the input feature maps Im1, Im2, and Im32 as the input feature maps 23-1, 23-2, . . . , and 23-32.

Herein, each of the computing devices D1, D2, D3 (the plurality of computing devices to be used in the computation) includes the intermediate memory areas of which the number "4" is the number of computing devices of the computing devices D1, D2, D3, and D4 (the plurality of computing devices). As mentioned above, one intermediate memory area 112b can store the feature map that the computing device has. Accordingly, each of the computing devices D1, D2, D3, and D4 can reliably store the feature map transmitted from the other computing device through communication between the computing devices in the intermediate memory area.

Then, in the same manner as in Comparative Example 1 described above, the computing device D1 performs the convolution computation to generate the convolution maps 13-1, 13-2, . . . , and 13-32 from the feature map 23-1, 23-2, . . . , and 23-32 and generate one output feature map by summing the elements of the convolution maps 13-1, 13-2, . . . , and 13-32. The output feature map 14-1 is the output channel 1.

As described above, in the case of performing the channel partitioning in the related art of Comparative Example 2, all the input feature maps required to generate one output feature map is collected into one computing device through communication between the computing devices (computing device D1 in FIG. 6) and, furthermore, the computation for the convolution layer is performed to generate the output feature map. In Comparative Example 2, the output feature map is also generated for each of the plurality of output channels. That is, not only the computing device D1, if necessary, but also computing device D2, D3, or D4 collect all the input feature maps required to generate one output feature map through communication between the computing devices and perform the computation for the convolution layer to generate the output feature map. As described above, in the channel partitioning in the related art of Comparative Example 2, the computing devices D1, D2, D3, and D4 perform the computation for the convolution layer in parallel.

Computation Procedure in Channel Partitioning in Second Embodiment, FIG. 7

FIG. 7 is a diagram illustrating an example of a computation procedure when the channel partitioning of the embodiment is performed in the DNN computation of the embodiment. In FIG. 7, configurations and data similarly to the configurations and data illustrated in FIG. 6 are denoted by the same reference numerals as those of the configurations and data illustrated in FIG. 6. In the example illustrated in FIG. 7, similarly to Comparative Example 2 illustrated in FIG. 6, the number of input channels and the number of input feature maps are set to 32, and the number of computing devices to be used in the computation and the number of channel partitions are set to 4.

Similarly to the example of FIG. 6, for each computing device, the eight input feature maps Im obtained by partitioning the total number "32" of input feature maps (input channels) of 32 by the number "4" of computing devices are allocated to each computing device.

In the embodiment, the filters f input to the respective computing devices are only the filters f necessary for the convolution computation for the convolution layer. That is, for each computing device, the eight filters f obtained by partitioning the total number "32" of filters by the number "4" of computing devices are transmitted to each computing device and stored in the memory 112 of each computing device.

Then, as illustrated in FIG. 7, in the second embodiment, unlike Comparative Example 2 illustrated in FIG. 6, each of the computing devices D1, D2, D3, and D4 performs the convolution computation on the eight input feature maps Im included in the input channel by using the filter f to generate the convolution maps 13-1, 13-2, . . . , and 13-32. Then, the convolution maps 13-1, 13-2, . . . , and 13-32 are stored in the intermediate memory areas corresponding to D2, D3, and D4 possessed by the computing device D1 through communication between the devices, and the computing device D1 generates the output feature map 14-1 of the output channel 1 by summing the respective elements of the convolution maps 13-1, 13-2, . . . , and 13-32. Heretofore, the procedure for generating one output feature map 14-1

(output channel 1) is described with reference to FIG. 7, but in the second embodiment, a plurality of the output feature maps are generated by the same procedure as the procedure illustrated in FIG. 7. Herein, the computing device generating the output feature maps by summing the respective elements of the convolution maps may be only the computing device D1 or may be any one of the computing devices D1, D2, D3, and D4 or all the computing devices D1, D2, D3, and D4.

As described above, in the computing apparatus 2 of the second embodiment, the number (8) of input feature map Im obtained by partitioning the total number (32) of input feature maps (input channels) Im to be used to generate one output feature map by the number (4) of the computing devices to be used in the computation among the plurality of computation areas is used as one set of the feature maps. Then, the computing apparatus 2 of the second embodiment groups the plurality of feature maps to be used in the computation for the layer into sets grouping the feature maps, stores each set grouping the partitioned feature maps in the memory area of each of the computation areas (any one of the computing devices D1 to D4) to be used in the calculation among the plurality of computation areas, and perform the computation so that the computation for the layer is performed.

Effect of Second Embodiment

In the process of the DNN computation, the computing apparatus 2 of the second embodiment performs the DNN computations in parallel by the channel partitioning performing the computations for the layers by grouping the plurality of feature maps to be used in the computation for the layer into sets grouping the feature maps without partitioning each of the plurality of feature maps to be used in the computation for the layer and allocating each set grouping the partitioned feature maps to each of the computation areas to be used in the computation among the plurality of computation areas. Accordingly, the computing apparatus 2 can appropriately perform the DNN computation in terms of high speed. Then, the computing apparatus 2 can facilitate implementing automation using AI computation. For example, the computing apparatus 2 can facilitate an advanced image analysis using AI and facilitate automation using the image analysis.

The computing apparatus 2 stores the convolution maps (the convolution maps 13-1 to 13-32 in the example of FIG. 7) generated by each of the plurality of computing devices (the computing devices D1 to D4 in the example of FIG. 7) to be used in the computation among the plurality of computing devices in the intermediate memory area of the computing device (computing device D1 in the example of FIG. 7) aggregating the convolution maps. Then, the computing apparatus 2 allows the computing device (computing device D1 in the example of FIG. 7) aggregating the convolution maps to generate the output feature map (feature map 14-1 in the example of FIG. 7) by summing respective elements of all the convolution maps stored in the intermediate memory area. Accordingly, the computing apparatus 2 can reliably execute the computation for the convolution layer.

Each of the computing devices 111a to 111n (the plurality of computing devices) includes the intermediate memory areas of which the number is the number of computation areas 113 included by the computing devices 111a to 111n (the plurality of computing devices) (the number of computing devices of the computing devices 111a to 111n in the second embodiment). Accordingly, each of the computing devices 111a to 111n can reliably store the feature map transmitted from the other computing device through communication between the computing devices in the intermediate memory area. Accordingly, the computing apparatus 2 can more reliably perform the DNN computation (particularly, the computation for the convolution layer).

Similarly to Comparative Example 2, in the embodiment, only the information on the filters required for computation by each of the computing devices is transmitted and input to each of the computing devices without transmitting and inputting the information on all filters to each of the computing devices. Accordingly, since the information amount of the filter information to be transmitted is reduced, the time required to transmit the filter information is shortened, so that the power consumption can be reduced. The computing apparatus 2 can reduce the amount of energy required for computation of the model and the amount of generated carbon dioxide emissions, to prevent global warming.

In Comparative Example 2, each computing device stores information on all filters, but in the embodiment, the filter information to be stored is only the information of the filter required by each computing device. Accordingly, in the embodiment, the capacity of the memory 112 of each computing device can be reduced. Specifically, when the number of computing devices is set to M, the capacity of the memory 112 required for storing the filters in each computing device can be reduced to 1/M of Comparative Example 2. The power consumed by the memory 112 to store the filters can also be reduced.

Modified Example 1

Similarly to the computing apparatus 2 of the second embodiment, a computing apparatus 2a of Modified Example 1 differs from a computing apparatus in the related art in that each of computing devices 111a to 111n (the plurality of computing devices) includes an intermediate memory area. The computing apparatus 2a of Modified Example 1 differs from the computing apparatus in the related art in that computation using channel partitioning is performed by using the intermediate memory area.

Similarly to Comparative Example 2, the computing apparatus 2a of Modified Example 1 groups all the input feature maps (input channels) Im to generate one output feature map as one set of the feature maps. For example, in the example similar to that of FIG. 6, the total number "32" of input feature maps are grouped into one set. When performing the channel partitioning, the computing apparatus 2a of Modified Example 1 stores the feature map of at least one other computation area in the intermediate memory area of at least one computation area and performs the computation.

As such, the computing apparatus 2a of Modified Example 1 can perform the DNN computation in a parallel process by performing the computation in the channel partitioning by using the intermediate memory area.

Modified Example 2

A computing apparatus 1a of Modified Example 2 has the features of the computing apparatus 1 of the first embodiment and the features of the computing apparatus 2 of the second embodiment. That is, similarly to the computing apparatus 1 of the first embodiment, the computing apparatus 1a of the modified example 2 switches the partitioning method from the spatial partitioning to the channel partitioning during the DNN computation; and similarly to the computing apparatus 2 of the second embodiment, in the computing apparatus 1a of the modified example 2, only the information such as filters required by each computing device to be used in the convolution layer or the like is transmitted to each computing device and is input to each computing device.

The computing device 1a of Modified Example 2 has the same functional units, hardware configuration, and software configuration as those of the computing apparatus 1 of the first embodiment. Therefore, descriptions of the functional units, hardware configuration, and software configuration of the computing apparatus 1a are omitted.

Effect of Modified Example 2

The computing device 1a stores the convolution map generated by each of the plurality of computing devices to be used in the computation in the intermediate memory area of the computing device aggregating convolution maps. Then, the computing apparatus 1a allows the computing device aggregating the convolution maps generates the output feature map by summing the respective elements of all the convolution maps stored in the intermediate memory area. Accordingly, the computing apparatus 1a can reliably execute the computation for the output layer.

Each of the computing devices 111a to 111n (the plurality of computing devices) includes intermediate memory areas of which the number is the number of computation areas 113 included by the computing devices 111a to 111n (the plurality of computing devices) (herein, the same number of computing devices as the computing devices 111a to 111n). Accordingly, each of the computing devices 111a to 111n can reliably store the feature map transmitted from the other computing device through communication between the computing devices in the intermediate memory area. Accordingly, the computing apparatus 1a can more reliably perform DNN computation.

Third Embodiment

A computing apparatus 3 of a third embodiment differs from the computing apparatus 2 of the second embodiment in the way of generating an output feature map from a convolution map. When the convolution maps are generated by respective computing devices, the computing apparatus 3 of the third embodiment generates partial sum maps by summing respective element of the generated convolution maps, and generates the output feature map by aggregates the partial sum maps into one computing device.

The computing apparatus 3 of the third embodiment has functional units, hardware configuration, and software configuration similar to those of the computing apparatus 1 of the first embodiment and those of the computing apparatus 2 of the second embodiment. Therefore, descriptions of the functional units, hardware configuration, and software configuration of the computing apparatus 3 of the third embodiment are omitted.

Figure 8:
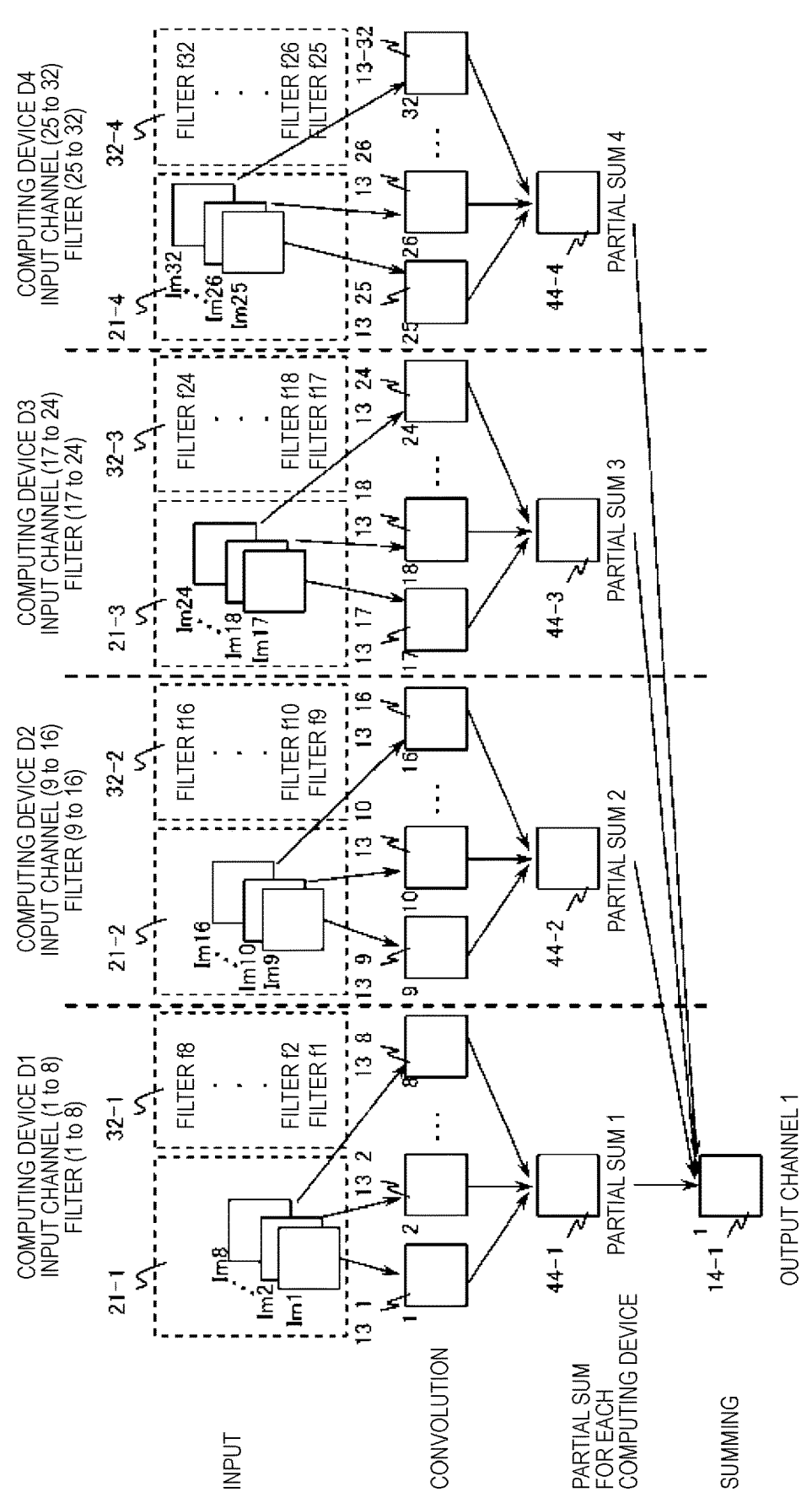
FIG. 8 is a diagram illustrating an example of a DNN computation procedure according to a third embodiment.

FIG. 8 is a diagram illustrating an example of a computation procedure when performing the channel partitioning of the embodiment by the DNN computation in the embodiment. In FIG. 8, configurations and data similar to those of the second embodiment illustrated in FIG. 7 are denoted by the same reference numerals as those of the configurations and data of the second embodiment illustrated in FIG. 7.

Similarly to the example of the second embodiment illustrated in FIG. 7, in the example illustrated in FIG. 8, illustrated is the procedure for generating the output feature map for one channel. In the example illustrated in FIG. 8, the number of input channels and the number of input feature map are set to 32, and the number of computing devices and the number of channel partitions to be used in the computation are set to 4. Similarly to the example of the second embodiment illustrated in FIG. 7, in the example illustrated in FIG. 8, for each computing device, the eight input feature maps Im obtained by partitioning the total number "32" of input feature maps (input channels) of 32 by the number "4" of computing devices are allocated to each computing device.

In the embodiment, similarly to the second embodiment, the filters f input to the respective computing devices are only the filters f necessary for the computation for the convolution layer. That is, for each computing device, information on the eight filters f obtained by partitioning the total number "32" of filters by the number "4" of computing devices is transmitted to each computing device and stored in the memory 112 of each computing device.

Then, similarly to the second embodiment illustrated in FIG. 7, each of the computing devices D1, D2, D3, and D4 performs the convolution computation on the input feature map Im included in the input channel by using the filter f to generate the convolution maps 13-1, 13-2, . . . , and 13-32.

Then, in the embodiment, each computing device generates the partial sum map by summing all the generated convolution maps. Then, the computing devices D2, D3, and D4 other than the computing device D1 transmit and store the partial sum map to the intermediate memory area of the computing device D1 aggregating the partial sum maps through communication between the computing devices. As such, the partial sum maps are aggregated in the computing device D1 aggregating the partial sum maps. The computing device D1 aggregating the partial sum maps generates the output feature map 14-1 of the output channel 1 by summing elements of all the aggregated partial sum maps.

For example, the computing device D1 generates the partial sum map 44-1 by summing the convolution maps 13-1, 13-2, . . . , and 13-8. The computing device D2 generates the partial sum map 44-2 by summing the convolution maps 13-9, 13-10, . . . , and 13-16 and sends the partial sum map 44-2 to the intermediate memory area of the computing device D1. In addition, the computing device D3 generates the partial sum map 44-3 by summing the convolution maps 13-17, 13-18, . . . , and 13-24 and transmits the partial sum map 44-3 to the intermediate memory area of the computing device D1.

Each of the computing devices D1, D2, D3, and D4 (the plurality of computing devices to be used in the computation) includes the intermediate memory areas of which the number "4" is the number of computing devices of the computing devices D1, D2, D3, and D4 (the plurality of computing devices). As mentioned above, one intermediate memory area 112*b* can store the feature map generated by one computing device. Accordingly, each of the computing devices D1, D2, D3, and D4 can reliably store the feature map transmitted through communication from the other computing device to the computing device in the intermediate memory area. For example, the partial sum map 44-2 generated by the computing device D2 is transmitted from the computing device D2 to the intermediate memory area of the computing device D1 through communication between the computing devices and stored in the intermediate memory area of the computing device D1. Similarly, the partial sum map 44-3 generated by the computing device D3 is transmitted from the computing device D3 to the intermediate memory area of the computing device D1 through communication between the computing devices and stored in the intermediate memory area of the computing device D1.

As such, each of the computing devices to be used in the computation generates the partial sum maps by summing all the generated convolution maps and transmits the generated partial sum maps to the intermediate memory area of the computing device aggregating the partial sum maps through communication between the computing devices, and stores in the intermediate memory area of the computing device aggregating the partial sum maps, and the computing device aggregating the partial sum maps aggregates all the partial sum maps in the intermediate memory area of the computing device aggregating the partial sum maps and generates the output feature maps.

Effect of Third Embodiment

The number of maps transmitted by each of the computing devices D2, D3, and D4 other than the computing device (computing device D1) aggregating the partial sum maps or the convolution maps to the computing device D1 which is a computing device aggregating the partial sum maps or the convolution maps is the same number (8=the total number of input channels/the number of computing devices to be used) as the number of input channels input to each of the computing devices in the second embodiment and is 1 in the embodiment. Therefore, in comparison to the computing apparatus 2 of the second embodiment, in the computing apparatus 3 of the embodiment, the number of maps to be transmitted through communication between the computing devices for performing the computation for the convolution layer can be reduced by 1/(total number of input channels/ the number of computing devices to be used). Accordingly, the capacity of the intermediate memory area of the computing device receiving and storing the feature map transmitted through communication between the computing devices can be reduced, and the memory capacity of the memory 112 of the computing devices can be reduced. The amount of data transmitted by the computing apparatus 3 through communication between the computing devices to perform the computation for the convolution layer can be reduced, and the power consumption required for the transmission can be reduced. Accordingly, the computing apparatus 3 can reduce the amount of energy required for computation of the DNN and the amount of generated carbon dioxide emissions, to prevent global warming.

Therefore, the computing apparatus 3 allows each of the plurality of computing devices (the plurality of computing devices D1 to D4 in the example of FIG. 8) among the computing devices 111*a* to 111*n* (the plurality of computing devices) to generate the partial sum maps (partial sum maps 44-1 to 44-4 in the example of FIG. 8) by summing the generated convolution maps (convolution maps 13-1 to 13-32 in the example of FIG. 8) and store the partial sum map in the intermediate memory area of the computing device (computing device D1 in the example of FIG. 8) aggregating the partial sum maps.

The computing apparatus 3 allows the computing device (computing device D1 in the example of FIG. 8) aggregating the partial sum maps (partial sum maps 44-1 to 44-4 in the example of FIG. 8) to generate the output feature map (the feature map 14-1 in the example of FIG. 8) by summing all the stored partial sum maps (partial sum maps 44-1 to 44-4 in the example of FIG. 8) stored in the intermediate memory area is obtained. Therefore, the maps that the computing apparatus 3 transmits and receives through communication between the computing devices to generate the output feature map may be partial sum maps of which the number is smaller than the number of convolution maps instead of the convolution maps (convolution maps 13-1 to 13-32 in the example of FIG. 8).

Accordingly, in the computation for the convolution layer, the computing apparatus 3 can reduce the amount of data transferred in the communication between the computing devices, can improve a computation speed of the convolution layer, and can further improve the computation speed of the DNN computation. The computing apparatus 3 can reduce the power consumption. Therefore, the computing apparatus 3 can analyze the image data at a higher speed and reduce the power consumption. The computing apparatus 3 can reduce the amount of energy required for the DNN computation of and the amount of generated carbon dioxide emissions, to prevent global warming.

Each of the computing devices 111a to 111n (the plurality of computing devices) includes the intermediate memory areas of which the number is the number of computation areas 113 (herein, the number of computing devices of the computing devices 111a to 111n) included in the computing devices 111a to 111n (the plurality of computing devices). Accordingly, each of the computing devices 111a to 111n can reliably store the feature map transmitted from the other computing device through communication between the computing devices in the intermediate memory area. Accordingly, the computing apparatus 1 can more reliably perform DNN computation.

Modified Example 3

A computing apparatus 1b of Modified Example 3 has the features of the computing apparatus 1 of the first embodiment and the features of the computing apparatus 3 of the third embodiment. That is, similarly to the computing apparatus 1 of the first embodiment, during the DNN computation, the computing apparatus 1b of Modified Example 3 switches the partitioning method from the spatial partitioning to the channel partitioning. Similarly to the computing apparatus 3 of the third embodiment, the computing apparatus 1b of Modified Example 3 allows each of the plurality of computing devices to be used in the computation to generate the partial sum map by summing the plurality of input feature maps for the computation for the convolution layer of the DNN computation and store all the partial sum maps in the intermediate memory area of one computing device aggregating the partial sum maps among the plurality of computing devices. The computing apparatus 1b allows the computing device aggregating the partial sum maps to generate the output feature map of the output channel by summing all the partial sum maps.

The computing device 1b of Modified Example 3 has the same functional units, hardware configuration, and software configuration as those of computing apparatus 1 of the first embodiment. Therefore, descriptions of the functional units, hardware configuration, and software configuration of the computing apparatus 1b are omitted.

Effect of Modified Example 3

The computing device 1b allows each of the plurality of computing devices (the plurality of computing devices) to be used in the computation among the computing devices 111a to 111n to generate the partial sum map by summing the generated convolution maps and stores the partial sum map in the intermediate memory area of the computing device aggregating the partial sum maps.

The computing apparatus 1b allows the computing device aggregating the partial sum maps generates the output feature map by summing all the partial sum maps stored in the intermediate memory areas. Therefore, the maps that the computing apparatus 1b transmits and receives through communication between the computing devices to generate the output feature map may be partial sum maps of which the number is smaller than the number than convolution maps instead of the convolution maps.

Accordingly, in the computation for the convolution layer, the amount of data transferred through communication between the computing devices can be reduced, the computation speed of the convolution layer can be improved, and the computation speed of the DNN computation can be improved. The power consumption can be reduced. Therefore, the computing apparatus 1b can analyze the image data at a higher speed and reduce the power consumption. The computing device 1b can reduce the amount of energy required for computation of the model and the amount of generated carbon dioxide emissions, to prevent global warming.

Each of the computing devices 111a to 111n (the plurality of computing devices) includes intermediate memory areas of which the number is the number of computation areas 113 included by the computing devices 111a to 111n (the plurality of computing devices) (herein, the same number of computing devices as the computing devices 111a to 111n). Accordingly, each of the computing devices 111a to 111n can reliably store the partial sum map transmitted from the other computing apparatus through communication between the computing devices in the intermediate memory area. Accordingly, the computing apparatus 1b can more reliably perform the DNN computation.

In the descriptions of the first to third embodiments above, each computing device includes the intermediate memory area of which the number is the same as the number of computing devices, but all the computing devices may not necessarily include the intermediate memory area of which the number is the same as the number of computing devices. The partial sums of the feature map may be partitioned for the plurality of computing devices and aggregated. Here, the total number of intermediate memory areas possessed by the plurality of computing devices may be the number of computing devices. The feature map from the plurality of computing devices may be stored in one intermediate memory area. Here, the number of intermediate memory areas that the computing apparatus is required to include is not limited thereto.

Fourth Embodiment

A computing apparatus 4 of a fourth embodiment will be described with reference to FIGS. 9 to 12. As described in detail below, the computing apparatus 4 of the embodiment differs from the computing devices 1 to 3 of the first to third embodiment in that the computing apparatus 4 determines the applicability of the DNN model based on the computation result of the DNN model with respect to the input image data and changes the DNN model and the number of computing devices (the number of computation areas) to be used for the image data to be input next.

Figure 9:
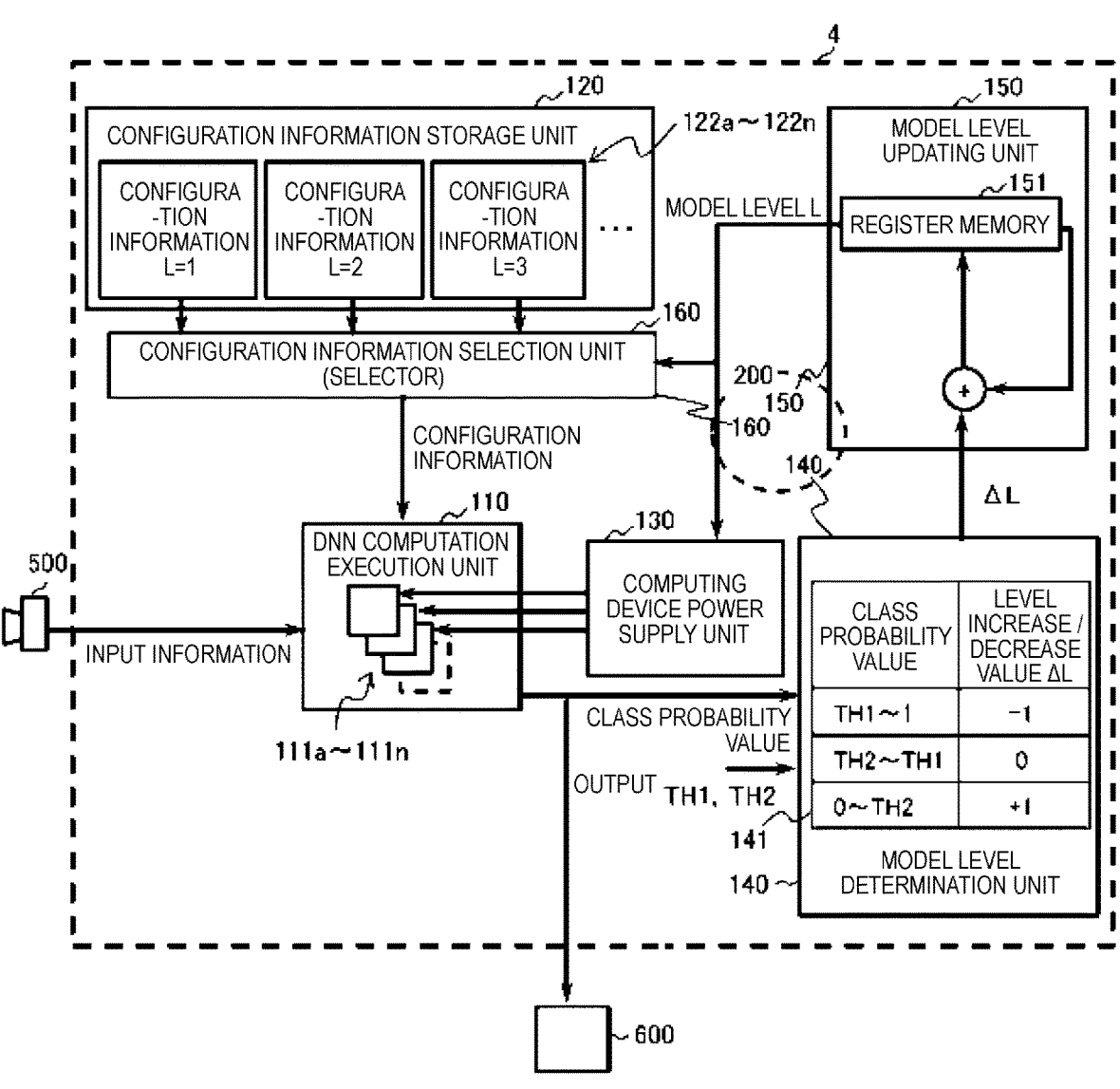
FIG. 9 is a diagram illustrating an example of a functional block diagram of a computing apparatus of a fourth embodiment.

FIG. 9 is a diagram illustrating an example of a functional block diagram of the computing apparatus 4 of the embodiment. As illustrated in FIG. 9, the computing apparatus 4 includes, in addition to the computing apparatus 1 of the first embodiment, configuration information 122a to 122n stored in a configuration information storage unit 120, a model level determination unit 140 having a model level determination table 141, a model level updating unit 150 having a register memory 151, and a configuration information selecting unit 160. Herein, a model adjustment unit 200 includes the model level determination unit 140, the model level updating unit 150, and the configuration information selection unit 160.

Figure 10:
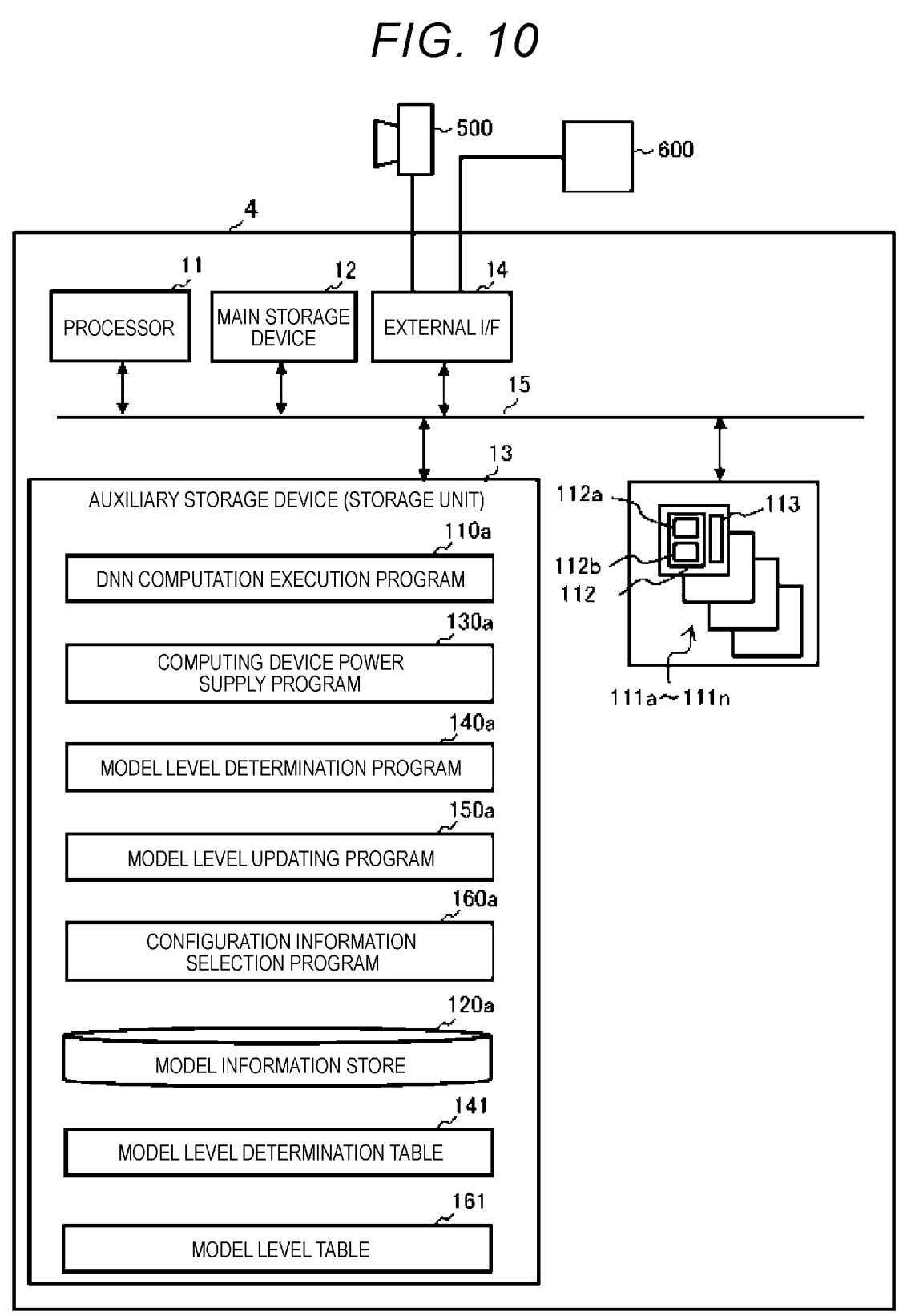
FIG. 10 is a diagram illustrating an example of a hardware/software configuration diagram of the computing apparatus according to the fourth embodiment.

FIG. 10 is a diagram illustrating an example of a hardware/software configuration diagram of the computing apparatus 4 of the embodiment. In the computing apparatus 4, in addition to the programs installed in the auxiliary storage device 13 of the computing apparatus 1, a model level determination program 140a, a model level updating program 150a, and a configuration information selection program 160a are further installed in the auxiliary storage device 13. A model information store 120a storing configuration information 122a to 122n and the plurality of DNN models, a model level determination table 141, and a model level table 161 are also stored in the auxiliary storage device 13.

The register memory of the model level updating unit 150 is a storage area generated in the main storage device 12.

The model level determination unit 140, the model level updating unit 150, and the configuration information selection unit 160 are implemented by the processor 11 reading out the model level determination program 140a, the model level updating program 150a, and the configuration information selection program 160a stored in the auxiliary storage device 13 to the main storage device 12 and executing the model level determination program 140a, the model level updating program 150a, and the configuration information selection program 160a. In the specification, when processes are described with sentences with the model level determination unit 140, the model level updating unit 150, and the configuration information selection unit 160 as the subjects, the sentences indicate that the processor 11 of the computing apparatus 4 executes the model level determination program 140a, the model level updating program 150a, and the configuration information selection program 160a implementing the corresponding functional units.

Similarly to the computing apparatus 1 of the first embodiment, the DNN computation execution unit 110 of the computing apparatus 4 performs the model computation while switching the partitioning method between the spatial partitioning and the channel partitioning meanwhile by using the image data (input information) input from the camera 500 in the computing devices 111a to 111n, calculates the output information including the class probability value as the computation result of the DNN model, and outputs the output information to the external device 600. The class probability value is a value (class probability value) representing accuracy of the computation result included in the output information. As mentioned above, the accuracy denotes a degree of correctness of the result of the DNN computation. And the accuracy does not denote the number of digits of the output data of the DNN computation. In general, the higher the class probability value, the higher the accuracy of the computation result. Then, when the class probability value is higher than a predetermined value, the accuracy of the computation result is considered to be sufficiently high. Therefore, here, sufficiently highly accurate output information is considered to be obtainable even when the computation of the model with a smaller computation scale is performed on the image data. Note that, although the class probability value is used as the accuracy in the embodiment, any value representing the accuracy of the computation result can be used instead of the class probability value.

The model level determination unit 140 calculates model level information specifying the DNN model and the number of computing devices (the number of computation areas) to be used in the computation of the input feature maps of the plurality of input channels generated from the image data (input information) next input from the camera 500 based on the class probability value (accuracy value) included in the output information output by the DNN computation execution unit 110 and the model level table 161 containing information on the computation scale of the DNN model.

Note that the model level determination unit 140 includes the model level determination table 141 storing an upper threshold value TH1 (first threshold value) and a lower threshold value TH2 (second threshold value) described later. The model level determination table 141 is stored in the auxiliary storage device 13.

The model level updating unit 150 updates a model level L based on the model level information calculated by the model level determination unit 140. The model level L is a ranking of the DNN model and the number of computing devices (the number of computation areas) according to the computation scale of the DNN model. In general, the model with a higher model level L can analyze more detailed information than the image data, and the computation scale is larger. Roughly, the higher the model level L, the more computing devices are required.

The configuration information selection unit 160 calculates the model level information which is information on the DNN model and the number of computing devices (the number of computation areas) to be used by the DNN computation execution unit 110 based on the model level L and the model level table 161 changed by the model level updating unit 150, selects the configuration information from the configuration information 122a to 122n, and transmits the selected configuration information and the model level information (the DNN model and the number of computing devices (the number of computation areas)) to the DNN computation execution unit 110. Accordingly, for the next image data to be acquired from the camera 500, the DNN computation execution unit 110 performs the computation of the DNN model indicated in the received model level information (the DNN model and the number of computing devices (the number of computation areas)) by using the configuration information selected by the configuration information selection unit 160, and the DNN computation execution unit 110 outputs the output information to the external device 600.

Figures 11, 12:
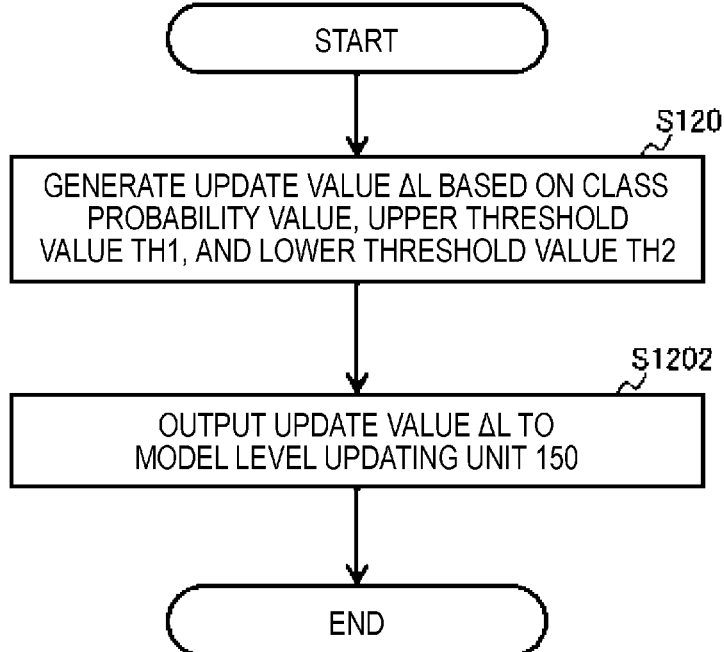
FIG. 11 is a diagram illustrating an example of a model level table of the fourth embodiment.
FIG. 12 is a flowchart illustrating an example of a model level determination process executed by a model level determination unit according to the fourth embodiment.

FIG. 11 is a diagram illustrating an example of a model level table 161. As illustrated in FIG. 11, the model level table 161 is a table storing a model level L 1101 and model level information 1102 which is the DNN model name and the number of computing devices (the number of computation areas) in association with each other.

Processing of Model Level Determination Unit 140
of Fourth Embodiment, FIG. 12

FIG. 12 is a flowchart illustrating an example of a model level determination process executed by the model level determination unit 140 of the fourth embodiment. When acquiring the class probability value from the DNN computation execution unit 110, the model level determination unit 140 executes the model level determination process of which the flowchart is illustrated in FIG. 12.

The model level determination unit 140 generates an update value ΔL based on the class probability value, the upper threshold value TH1 (first threshold value), and the lower threshold value TH2 (second threshold value) (step S1201). Herein, the model level determination unit 140 generates the update value ΔL according to the class probability value, as described in (1) to (3) below.

(1) When the class probability value is larger than the upper threshold value TH1 (upper threshold value TH1<class probability value), the update value ΔL is set to −1 (update value ΔL=−1). Here, the analysis result of the model has a sufficiently high accuracy, and even when the image data is analyzed by using the model level information (the DNN model name and the number of computing devices (the number of computation areas)) with a lower model level L, a sufficiently accurate analysis result is considered to be obtainable. Therefore, here, the computing apparatus 4 transmits the model level information (information on the DNN model name and the number of computing devices (the number of computation areas)) of the model of which the model level L is smaller by one to the DNN computation execution unit 110 to use the model level information (the DNN model name and the number of computing devices (the number of computation areas)) of the model of which the model level L is smaller by one in the subsequent step S1202 for the image data to be acquired next.

(2) When the class probability value is smaller than the lower threshold value TH2 (class probability value<lower threshold value TH2), the update value ΔL is set to 1 (update value ΔL=1). Here, the analysis result of the model has an insufficient accuracy, and unless the image data is analyzed by using the model with a higher model level L, a sufficiently accurate analysis result is not considered to be obtainable. Therefore, here, the computing apparatus 4 transmits the model level information (information on the DNN model name and the number of computing devices (the number of computation areas)) of the model of which the model level L is higher by one to the DNN computation execution unit 110 to use the model level information of the model of which the model level is higher by one (model level L is higher by one) for the image data to be acquired next.

(3) When the class probability value is equal to or larger than the lower threshold value TH2 and equal to or smaller than the upper threshold value TH1 (lower threshold value TH2 class probability value upper threshold value TH1), the update value ΔL is set to 0 (update value ΔL=0). Here, the computing apparatus 4 does not change the DNN model and the number of computing devices (the number of computation areas) to be used for the image data to be acquired next. That is, in the subsequent step S1202, the computing apparatus 4 does not transmit the model level information (information on the DNN model name and the number of computing devices (the number of computation areas)) to the DNN computation execution unit 110.

For example, as a result of performing the image analysis using the DNN model by the computing apparatus 4, when the class probability value output by the computing apparatus 4 is 0.999 and the upper threshold value TH1 is 0.85, the class probability value of 0.999 is larger than the upper threshold value TH1 (=0.85) (upper threshold value TH1<class probability value), the model level information (the DNN model name and the number of computing devices (the number of computation areas) is used in which the model level L for the image data to be acquired next is lower by one (the model level L is smaller by one).

Next, the model level determination unit 140 outputs the update value ΔL to the model level updating unit 150 and ends the process (step S1202). When acquiring the update value ΔL, the model level updating unit 150 updates the value of the model level L stored in the register memory 151 to a value obtained by adding the value of the update value ΔL to the already stored value of the model level L. When updating the value of the model level L (when update value ΔL is −1 or 1), the model level updating unit 150 transmits the updated value of the model level L to the configuration information selection unit 160.

When receiving the value of the model level L, the configuration information selection unit 160 extracts the model level information (information on the DNN model name and the number of computing devices (the number of computation areas)) associated with the model level L received from the model level table 161. Herein, the configuration information selection unit 160 transmits the configuration information selected from among the configuration information 122a to 122n based on the extracted model level information and the extracted model level information (information on the DNN model name and the number of computing devices (the number of computation areas) to the DNN computation execution unit 110. Accordingly, the DNN model and the number of computing devices (the number of computation areas) to be used in the computation using the computing devices 111a to 111n for the image data (input information) to be next acquired from the camera 500 are changed. Then, the DNN computation execution unit 110 allows the computing device power supply unit 130 to start supplying power to the computing device to be used among the computing devices 111a to 111n.

As described above, the model adjustment unit 200 includes the model level determination unit 140, the model level updating unit 150, and the configuration information selection unit 160. Then, the model adjustment unit 200 determines the applicability of the DNN model based on the class probability value (accuracy value) included in the output information and the upper threshold value TH1 (first threshold value) and the lower threshold value TH2 (second threshold value) (information on the computation scale of the DNN model) and calculates the model level information specifying the DNN model and the number of computation areas to be used in the DNN computation for the plurality of input feature maps generated from the input information to be input next.

Effect of Fourth Embodiment

In the embodiment, feedback adaptive control of changing the computation scale of the model and the number of computing devices to be supplied with power is performed by switching the model and the number of computing devices (the number of computation areas) to be used based on the class probability value representing the accuracy value of the DNN computation result. Accordingly, the power consumption can be reduced while ensuring required analysis accuracy according to the situation.

That is, the computing apparatus 4 calculates the DNN model and the number of computing devices (the number of computation areas), which are used by model adjustment unit 200 in the DNN computation for the plurality of input feature maps generated from the input information to be input next based on the class probability value (accuracy value) included in the output information that is the output of the computation of the DNN model. Then, the DNN computation execution unit changes the models and the number of computing devices (the number of computation areas) with different computation scales calculated by the model adjustment unit 200. Therefore, when the accuracy of the computation result is sufficiently high, the computing apparatus 4 can perform the computation of the DNN model by changing to the DNN model and the number of computing devices (the number of computation areas) with a small computation scale, which requires less power consumption for computation. Therefore, the computing apparatus 4 can more appropriately perform the computation of the DNN model in that the power consumption can be reduced while ensuring the accuracy required for the computation result. The computing apparatus 4 can reduce the amount of energy required for computation of the DNN model and the amount of generated carbon dioxide emissions, to prevent global warming. The computing apparatus 4 can perform an advanced image analysis by using AI with low power consumption, and can facilitate automation using the image analysis.

In the computing apparatus 4, the model level determination unit 140 of the model adjustment unit compares the sizes of the class probability value (accuracy value), the upper threshold value TH1 (first threshold value), and the lower threshold value TH2 (second threshold value), and the DNN computation execution unit 110 changes the DNN model and the number of computing devices (the number of computation areas) to be used in the DNN computation for the plurality of input feature maps generated from the input information to be input next to the model and the number of computing devices (the number of computation areas) with a smaller computation scale or the model and the number of computing devices (the number of computation areas) with a larger computation scale based on the comparison result. Accordingly, it is possible to more reliably change the DNN model and the number of computing devices (the number of computation areas) to be used in the DNN computation for the plurality of input feature maps generated from the input information to be input next. Therefore, the computing apparatus 4 can more reliably reduce the power consumption while more reliably ensuring the accuracy required for the computation result.

The computing apparatus 4 uses the class probability values which are relatively easy to acquire from the output of the computation of the DNN model as accuracy. Accordingly, the computing apparatus 4 can relatively easily acquire the accuracy value and calculate the model level information. Accordingly, the computing apparatus 4 can more easily reduce the power consumption while more easily ensuring the accuracy required for the computation result.

Fifth Embodiment

A computing apparatus 5 of a fifth embodiment will be described with reference to FIGS. 13 to 17C. Although details will be described below, the computing apparatus 5 of the embodiment includes a peripheral environment recognition unit 170 determining sparseness and denseness of the environment reflected in a camera image acquired from the camera 500 in addition to the computing apparatus 4 of the fourth embodiment. The DNN computation execution unit 110 switches the DNN model and the number of computing devices (the number of computation areas) to be used and the configuration information based on the determination of the peripheral environment recognition unit 170.

Figure 13:
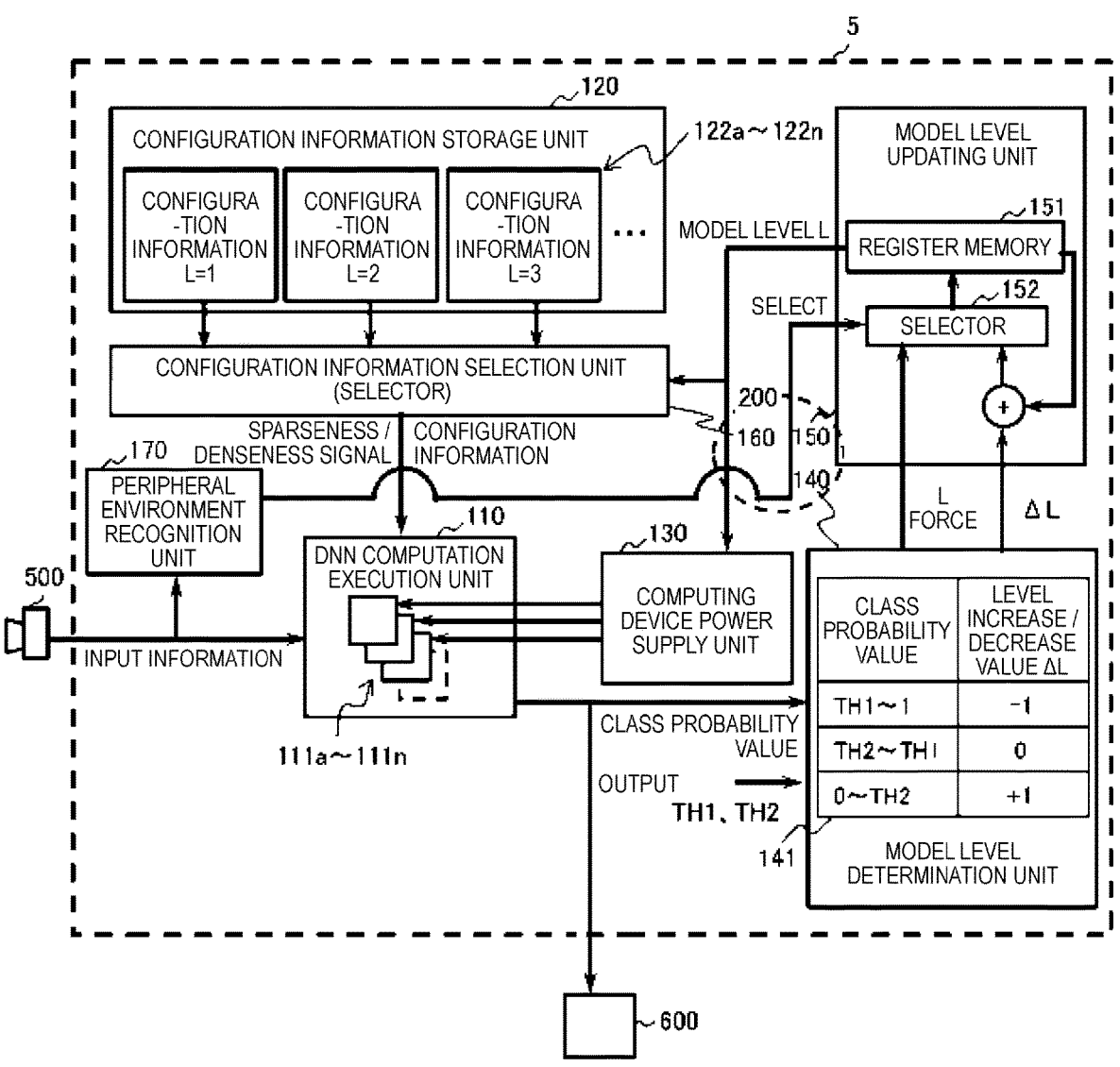
FIG. 13 is a diagram illustrating an example of a functional block diagram of a computing apparatus of a fifth embodiment.

FIG. 13 is a diagram illustrating an example of a functional block diagram of the computing apparatus 5 of the embodiment. As illustrated in FIG. 13, the computing apparatus 5 includes the peripheral environment recognition unit 170 in addition to the computing apparatus 4 of the fourth embodiment.

Figure 14:
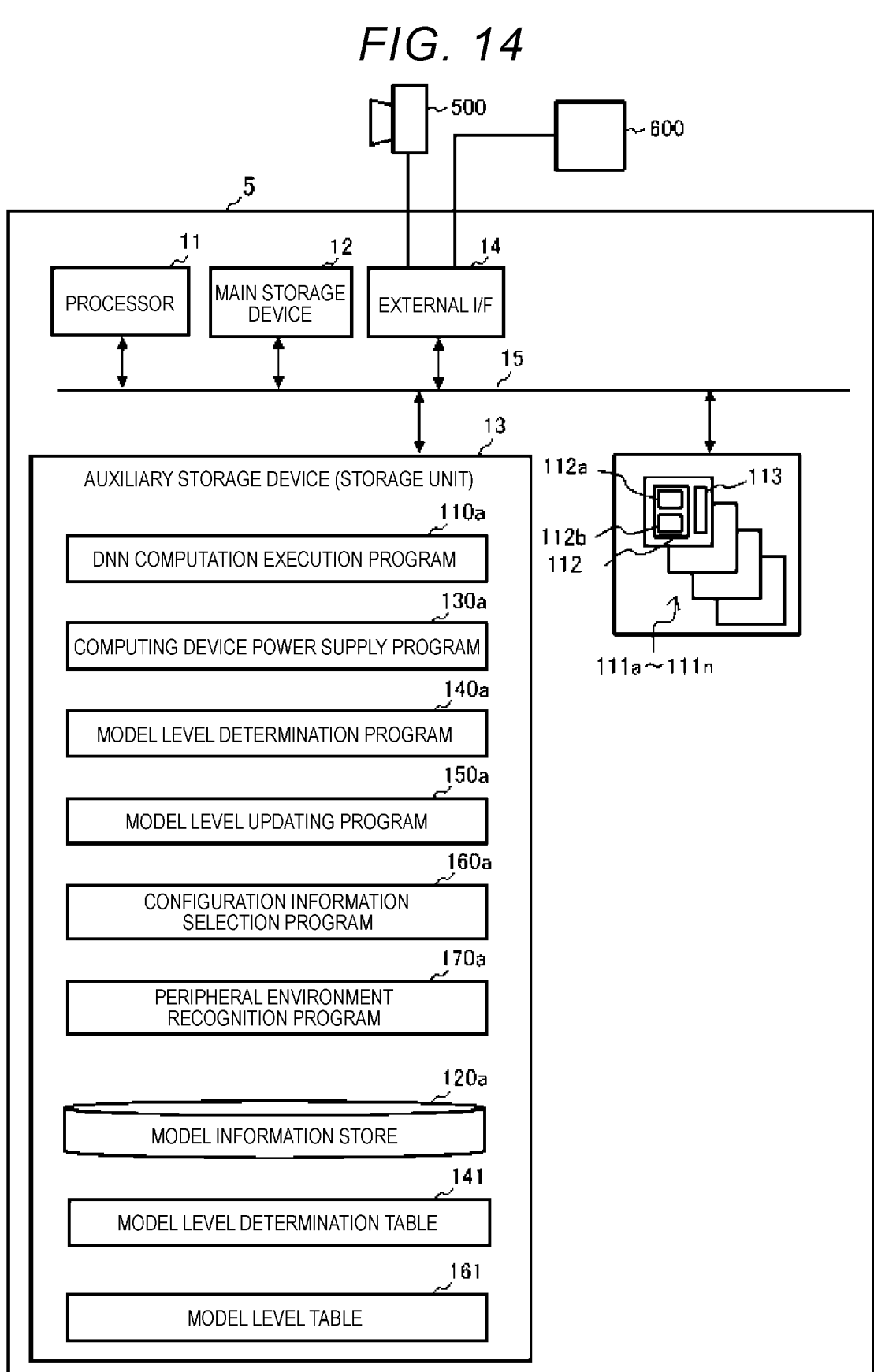
FIG. 14 is a diagram illustrating an example of a hardware/software configuration diagram of the computing apparatus according to the fifth embodiment.
Figure 15:
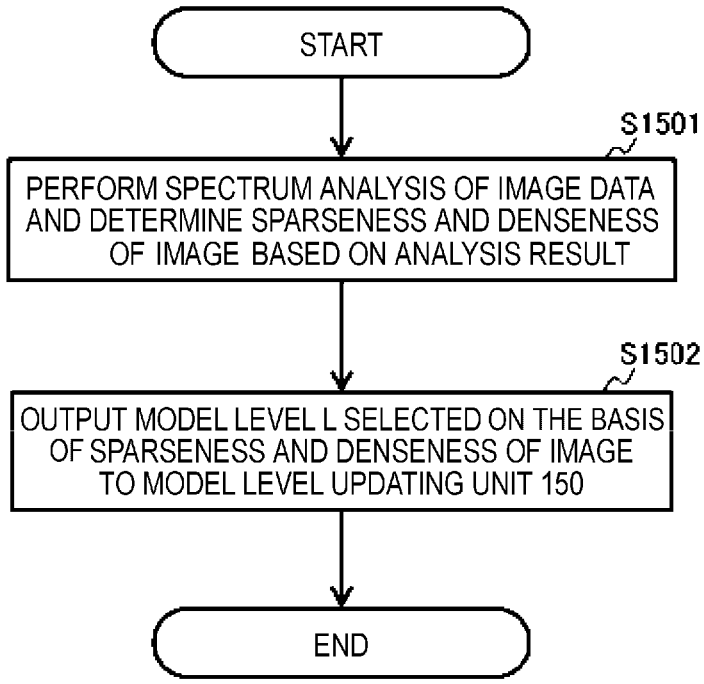
FIG. 15 is a flowchart illustrating an example of a peripheral environment recognition process executed by a peripheral environment recognition unit according to the fifth embodiment.

FIG. 14 is a diagram illustrating an example of a hardware/software configuration diagram of the computing apparatus 5 of the embodiment. In the computing apparatus 5, in addition to the programs installed in the auxiliary storage device 13 of the computing apparatus 4, a peripheral environment recognition program 170a is installed in the auxiliary storage device 13. The peripheral environment recognition unit 170 is implemented by the processor 11 reading out the peripheral environment recognition program 170a stored in the auxiliary storage device 13 into the main storage device 12 and executing the peripheral environment recognition program 170a. In the specification, when processes are described by using sentences with the peripheral environment recognition unit 170 as the subject, the sentence indicates that the processor 11 of the computing apparatus 5 executes the peripheral environment recognition program 170a that implements the corresponding function unit.

Process of Peripheral Environment Recognition
Unit 170 of Fifth Embodiment, FIGS. 15 to 17C FIG. 15 is a flowchart illustrating an example of the peripheral environment recognition process executed by the peripheral environment recognition unit 170 of the fifth embodiment. When acquiring the image data (input information) input from the camera 500, the peripheral environment recognition unit 170 executes the peripheral environment recognition process, the example of which is illustrated in FIG. 13.

The peripheral environment recognition unit 170 performs the spatial spectrum analysis on the acquired image data and determines the sparseness and denseness of the environment reflected in the camera image as follows based on the analysis result of the spatial spectrum analysis (step S1501).

Figure 16A:
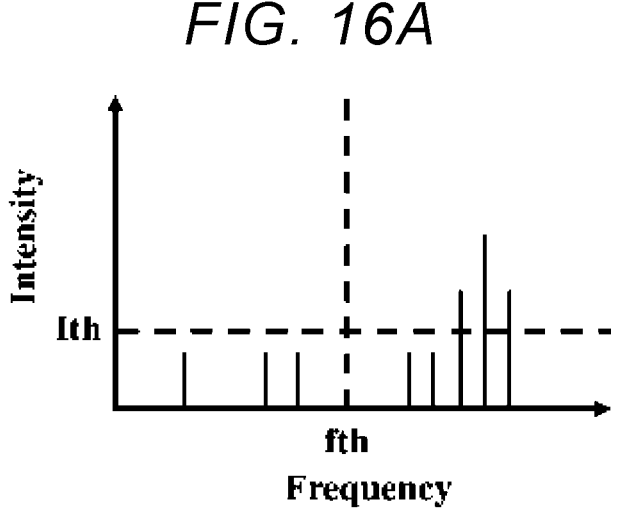
FIG. 16A is a diagram illustrating determination of sparseness/denseness of an environment reflected in a camera image based on an analysis result of a spatial spectrum analysis.
Figures 16B, 17A, 17B:
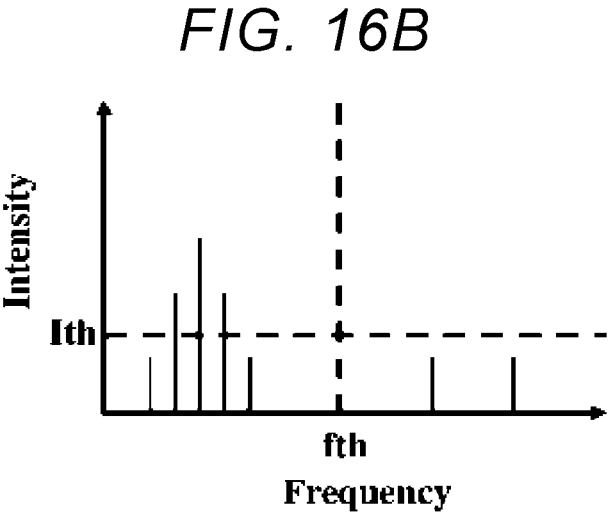
FIG. 16B is a diagram illustrating the determination of sparseness/denseness of the environment reflected in the camera image based on the analysis result of the spatial spectrum analysis.
FIG. 17A is a diagram illustrating an example of a time chart of model level L update.
FIG. 17B is a diagram illustrating an example of a time chart of model level L update of the computing apparatus of the fourth embodiment without feedforward control of the fifth embodiment.

FIGS. 16A and 16B are explanatory diagrams illustrating the determination of sparseness and denseness of the environment reflected in the camera image based on the analysis result of the spatial spectrum analysis.

As illustrated in the spatial spectrum of FIG. 16A, when the spatial spectrum of the camera image has an intensity of a predetermined intensity threshold value Ith or more in a frequency area of a predetermined frequency threshold value fth or more, the peripheral environment recognition unit 170 determines that the environment is dense. On the other hand, as illustrated in the spatial spectrum of FIG. 16B, when the spatial spectrum of the camera image does not have an intensity of the predetermined intensity threshold value Ith or more in a frequency area of the predetermined frequency threshold value fth or more, the peripheral environment recognition unit 170 determines that the environment is sparse.

Next, the peripheral environment recognition unit 170 outputs the model level L selected on the basis of the sparseness and denseness of the environment reflected in the camera image determined in step S1501 and the current model level L to the model level updating unit 150, and ends the process (step S1502). The model level updating unit 150 sets the model level information (the DNN model name and the number of computing devices (the number of computation areas)) associated with the model level L received from the peripheral environment recognition unit 170 from the model level table 161 (refer to FIG. 11) and the configuration information selected from among the configuration information 122a to 122n and transmits the model level information and the configuration information to the DNN computation execution unit 110. The DNN computation execution unit 110 specifies the DNN model and the computation areas by using the received model level information (the DNN model name and the number of computing devices (the number of computation areas)) and the configuration information and uses the DNN model and the computation areas for the DNN computation on the plurality of input feature maps. Accordingly, the DNN model and the number of computing devices (the number of computation areas) to be used in the computation using the computing devices 111a to 111n for the image data (input information) to be acquired next from the camera 500 are changed.

As such, the computing apparatus 5 allows the peripheral environment recognition unit 170 to perform the spatial spectrum analysis on the image data, determine the sparseness and denseness of the environment reflected in the camera image based on the analysis result of the spatial spectrum analysis, and perform feedforward control to change the DNN model to be used by the DNN computation execution unit 110 based on the determination result. Accordingly, as described below, the model to be used can be changed more quickly than the computing apparatus 4 of the fourth embodiment.

FIG. 17A is a diagram illustrating an example of a time chart of updating the model level L. FIG. 17A illustrates a change in a sparseness/denseness signal from a spatial spectrum analysis unit. 0 and 1 indicate that the environment is sparse and dense respectively (0=sparse, 1=dense). FIG. 17A illustrates that the environment changes from sparse to dense at time T0.

FIG. 17B is a diagram illustrating an example of a time chart of updating the model level L of the computing apparatus 4 of the fourth embodiment without the feedforward control of the fifth embodiment. On the other hand, FIG. 17C is a diagram illustrating an example of a time chart of updating the model level L of the computing apparatus 5 of the fifth embodiment with the feedforward control of the fifth embodiment. Herein, in the diagrams of FIGS. 17B and 17C, it is assumed that the appropriate model level L is 4 after time T0 and the model level L is 1 at time T0.

In the computing apparatus 4 of the fourth embodiment without the feedforward control of the fifth embodiment illustrated in FIG. 17B, the model level L is raised up step by step each time the camera image is input and the output result is generated from time T0 to time T1.

On the other hand, in the computing apparatus 5 of the fifth embodiment with the feedforward control of the fifth embodiment illustrated in FIG. 17C, the peripheral environment recognition unit 170 determines that the environment becomes dense at time T0, raises the model level L to a predetermined value of 5 at time T0, and after that, sets an appropriate model level 4 by one-time feedback control (control by the class probability value representing the accuracy) at time T2, which is earlier than time T1.

Effect of Fifth Embodiment

As such, the computing apparatus 5 of the fifth embodiment, which also uses the feedforward control, can reach an appropriate model level earlier than the computing apparatus 4 of the fourth embodiment, which uses only the feedback control. Accordingly, the computing apparatus 5 of the fifth embodiment can reduce the power consumption compared to the computing apparatus 4 of the fourth embodiment.

That is, the computing apparatus 5 sets the DNN model and the number of computing devices (the number of computation areas) to be used based on the analysis result of the spatial spectrum analysis for the image data (input information) input from the camera 500 calculated by the peripheral environment recognition unit 170 and uses the DNN model and computing devices (computation areas) specified by the set DNN models and the set number of computing devices (the number of computation areas) for the DNN computation on the input feature map.

Accordingly, the computing apparatus 5 can more quickly change the DNN model and the computing device (computation area) to be used and can perform the DNN computation on the input feature maps. Therefore, the computing apparatus 5 can more reliably reduce the power consumption while ensuring the accuracy required for the computation result.

Sixth Embodiment

A computing apparatus 6 of a sixth embodiment will be described with reference to FIGS. 18 and 19. Although the details will be described below, the computing apparatus 6 of the embodiment has the configuration of the computing apparatus 5 of the fifth embodiment, except a configuration in which the computing devices 111a to 111n are replaced with one computing device 111x including computation areas 111xa to 111xn.

FIG. 18 is a diagram illustrating an example of a functional block diagram of the computing apparatus 6 of this embodiment. As illustrated in FIG. 18, the computing apparatus 6 includes the computing device 111x including the computation areas 111xa to 111xn instead of the computing devices 111a to 111n of the computing apparatus 5 of the fifth embodiment. Each of the computation areas 111xa to 111xn can perform computations similar to those of the computing devices 111a to 111n.

The DNN computation execution unit 110 of the computing apparatus 6 transmits the input feature map (input channel) to the computing device 111x and inputs the input feature map to the computing device 111x.

FIG. 19 is a diagram illustrating an example of the model level table 161 of the sixth embodiment. The configuration information storage unit 120 of the computing apparatus 6 stores the model level table 161 of the sixth embodiment. As described above, the model level table 161 (refer to FIG. 11) of the fourth and fifth embodiments stores the model level L 1101, the DNN model name and the number 1102 of the computing devices (computation areas) in association with each other. On the other hand, as illustrated in FIG. 19, the model level table 161 of the sixth embodiment stores a model level L 1901 and the DNN model name and the number 1902 of computation areas to be used in the computation in association with each other.

The computing device power supply unit 130 manages power supply to the computation areas 111xa to 111xn of the computing device 1112 instead of managing power supply to the computing devices 111a to 111n.

The computing device 111x of the embodiment includes the intermediate memory areas provided with the number of computation areas 111xa to 111xn. All of the computation areas 111xa to 111xn use the intermediate memory areas of which the number is the same number as the provided computation areas 111xa to 111xn for computation.

Effect of Sixth Embodiment

In the computing device 111x of the embodiment, all the computation areas 111xa to 111xn share and use the intermediate memory areas of which the number is the same number as the provided computation areas 111xa to 111xn. Accordingly, the computing apparatus 6 of the sixth embodiment can reduce the number of intermediate memory areas compared to the computing apparatus 5 of the fifth embodiment. The computing apparatus 6 can execute computations of the DNN model without performing communication between the computing devices. Therefore, the computing apparatus can reduce the power consumption and execute the computation of the DNN model at a higher speed.

Seventh Embodiment

A computing apparatus 7 of a seventh embodiment will be described with reference to FIG. 20. The computing apparatus 4 of the fourth embodiment generates the update value ΔL taking three values of 1, 0, and −1 based on the class probability value and the preset upper threshold value TH1 and the preset lower threshold value TH2. On the other hand, in the computing apparatus 7 of the embodiment, the update value ΔL taking five values of 2, 1, 0, −1, and 2 is generated based on the class probability value and the four preset threshold values TH1, TH2, TH3, and TH4.

Figure 20:
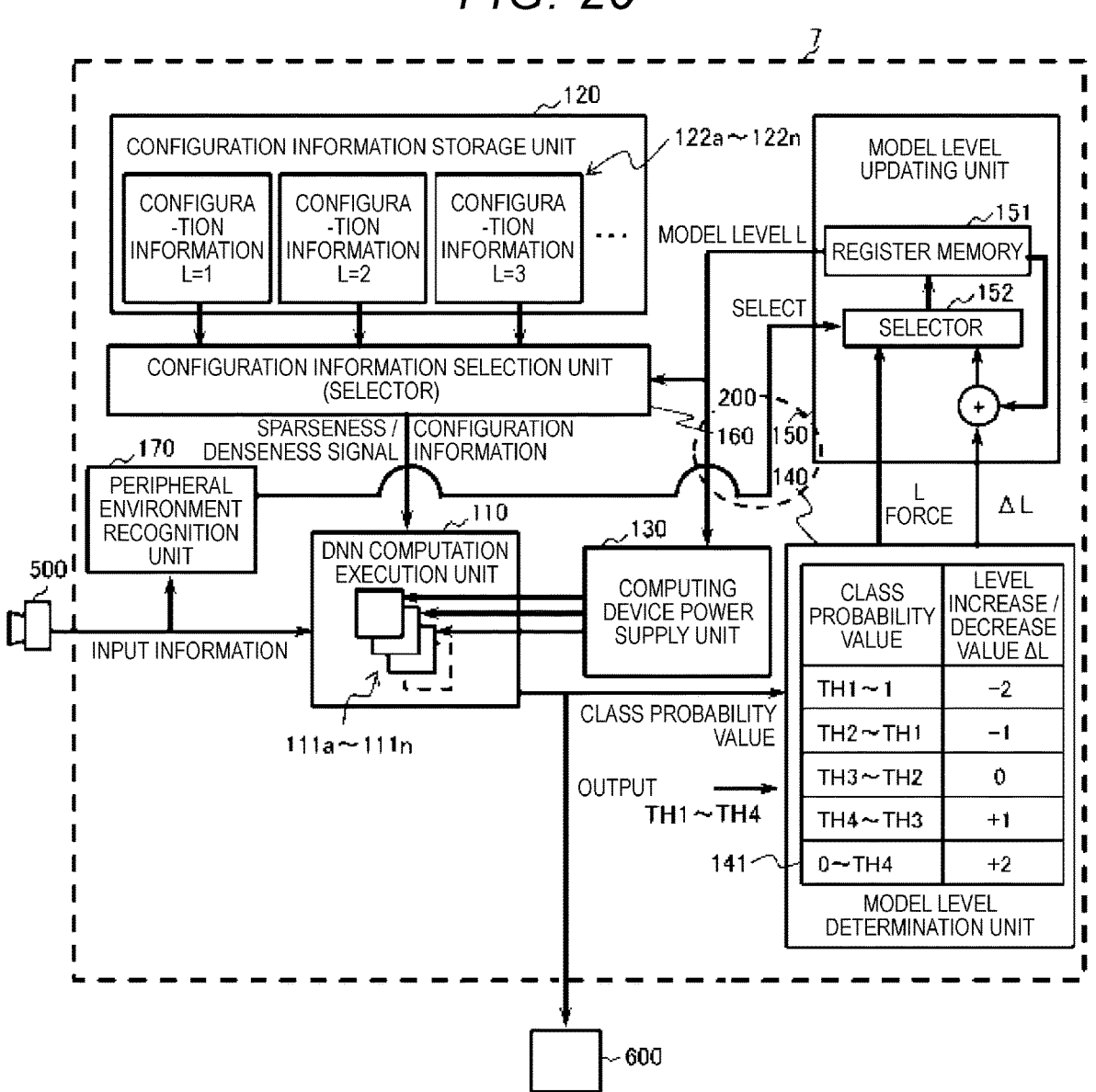
FIG. 20 is a diagram illustrating an example of a functional block diagram of a computing apparatus of a seventh embodiment.

FIG. 20 is a diagram illustrating an example of a functional block diagram of the computing apparatus 7 of the embodiment. As illustrated in FIG. 20, the computing apparatus 7 differs from the computing apparatus 4 of the fourth embodiment in terms of the model level determination table 141 included by the model level determination unit 140. The model level determination table 141 of the embodiment stores four threshold values including the first threshold value TH1, the second threshold value TH2, the third threshold value TH3, and the fourth threshold value TH4.

In the process of the model level determination unit 140 of the seventh embodiment, the update value ΔL is generated as follows (1) to (5). (1) When the class probability value is larger than the first threshold value TH1 (TH1<class probability value), the update value ΔL is set to −2 (update value ΔL=−2). (2) When the class probability value is larger than the second threshold value TH2 and equal to or smaller than the first threshold value TH1 (TH2<class probability value ≤ TH1), the update value ΔL is set to −1 (update value ΔL=−1). (3) When the class probability value is larger than the third threshold value TH3 and equal to or smaller than the second threshold value TH2 (TH3<class probability value≤TH2), the update value ΔL is set to 0 (update value ΔL=0). (4) When the class probability value is larger than the fourth threshold value TH4 and equal to or smaller than the third threshold value TH3 (TH4<class probability value≤TH3), the update value ΔL is set to 1 (update value ΔL=1). (4) When the class probability value is equal to or smaller than the fourth threshold value TH4 (class probability value≤TH4), the update value ΔL is set to 2 (update value ΔL=2).

Note that, in the seventh embodiment, four threshold values are used including the first threshold value TH1, the second threshold value TH2, the third threshold value TH3, and the fourth threshold value TH4, but the number of class probability values may be three or more.

Effect of Seventh Embodiment

Compared to the computing apparatus 4 of the fourth embodiment in which the update value ΔL changes by the absolute value of 1, in the embodiment in which the update value ΔL changes in the absolute value of 2 or less, since the value of the update value ΔL can change more greatly, the computing apparatus 7 of the embodiment can more quickly reach the appropriate model level (the DNN model and the number of computing devices (the number of computation areas)) according to the camera image. Accordingly, the computing apparatus 7 of the embodiment can also reduce the power consumption compared to the computing apparatus 4 of the fourth embodiment.

Although the above description is in detail with reference to the drawings, the invention is not limited to the various examples described above, and various modifications can be made without departing from the spirit of the invention. For example, in the computing apparatuses 1 to 3 of the first to third embodiments, the computing devices 111a to 111n may be replaced with the computing device 111x having the computation areas 111xa to 111xn of the sixth embodiment.

What is claimed is:

1. A computing apparatus including at least one computing device including at least one computation area for performing computation, the computing apparatus performing deep neural network (DNN) computation by using the computing device, the computing device including an intermediate memory area, the computing apparatus comprising:

a plurality of the computation areas; and a DNN computation execution unit acquiring input information, generating a plurality of input feature maps from the input information, transmitting the generated plurality of input feature maps to the computing device to be used in the computation among the computing devices, and performing DNN computation on the plurality of input feature maps in parallel by using the plurality of computation area, wherein the DNN computation execution unit performs the DNN computation in parallel on the plurality of input feature maps in at least one DNN partitioning method, wherein the DNN partitioning method when performing the DNN computation in parallel includes at least channel partitioning, in which, in the process of DNN computation, (1) without partitioning each of the plurality of feature maps to be used in the computation for the layer, the plurality of feature maps to be used in the computation for the layer are grouped into sets grouping the feature maps and (2) the computation for the layer is performed on each set grouping the feature maps, and wherein when performing at least the channel partitioning, the computation is performed by storing a result of performing the computation on the feature map or the feature map included in at least one of the different computation areas in the intermediate memory area included in at least another one of the computation areas.

2. The computing apparatus according to claim 1, wherein the DNN computation execution unit stores the convolution maps generated by each of the plurality of computing devices to be used in the computation among the plurality of computing devices in the intermediate memory area of the computing device aggregating the convolution maps, and allows the computing device aggregating the convolution maps to generate an output feature map by summing respective elements of all the convolution maps stored in the intermediate memory area.

3. The computing apparatus according to claim 2, wherein the computing device includes the intermediate memory areas of which the number is the number of the computation areas.

4. The computing apparatus according to claim 1, wherein the DNN computation execution unit allows each of the plurality of computing devices to be used in the computation among the plurality of computing devices to generate a partial sum map obtained by summing the generated convolution maps and store the partial sum maps in the intermediate memory area of the computing device aggregating the partial sum maps, and allows the computing device aggregating the partial sum maps to generate the output feature map by summing all the partial sum maps stored in the intermediate memory area.

5. The computing apparatus according to claim 4, wherein the computing device includes the intermediate memory areas of which the number is the number of computation areas.

6. A computing apparatus including at least one computing device including at least one computation area for performing computation, the computing apparatus performing deep neural network (DNN) computation by using the computing device, the computing apparatus comprising:

a plurality of the computation areas; and a DNN computation execution unit acquiring input information, generating a plurality of input feature maps from the input information, transmitting the generated plurality of input feature maps to the computing device to be used in the computation among the computing devices, and performing DNN computation on the plurality of input feature maps in parallel by using the plurality of computation area, wherein in a process of the DNN computation, the DNN computation execution unit switches a partitioning method between:

spatial partitioning for partitioning the feature map into a plurality of the feature maps inside a plane, allocating each of the partitioned feature maps to each of the plurality of computation areas, and performing the computation for the layer; and channel partitioning which (1) without partitioning each of the plurality of feature maps used in the computation for the layer, grouping the plurality of feature maps to be used in the computation for the layer into sets grouping the feature maps, and (2) allocates each set grouping the feature maps to each computation area to be used among the plurality of computation areas.

7. The computing apparatus according to claim 6, wherein each of the plurality of computing devices includes a computation memory area to be used in the computation, and wherein the DNN computation execution unit switches the partitioning method from the spatial partitioning to the channel partitioning in front of the layer selected from the layer of the DNN computation based on at least one of a process speed of the plurality of computing devices, the number of computing devices among the plurality of computing devices, the number of computation areas, and a capacity of a computation memory of the plurality of computing devices.

8. The computing apparatus according to claim 6, wherein the computing device includes an intermediate memory area, and wherein the DNN computation execution unit stores the convolution maps generated by each of the plurality of computing devices to be used in the computation among the plurality of computing devices in the intermediate memory area of the computing device aggregating the convolution maps and allows the computing device aggregating the convolution maps to generate an output feature map by summing elements of all the convolution maps stored in the intermediate memory area.

9. The computing apparatus according to claim 8, wherein the computing device includes the intermediate memory areas of which the number is the number of computation areas.

10. The computing apparatus according to claim 6, wherein the DNN computation execution unit allows each of the plurality of computing devices to be used in the computation among the plurality of computing devices to generate a partial sum map obtained by summing the generated convolution maps, stores the partial sum map in the intermediate memory area of the computing device aggregating the partial sum maps, and allows the computing device aggregating the partial sum maps to generate the output feature map by summing all the partial sum maps stored in the intermediate memory area.

11. The computing apparatus according to claim 10, wherein the computing device includes the intermediate memory areas of which the number is the number of computation areas.

12. A computing apparatus including at least one computing device including at least one computation area for performing computation, the computing apparatus performing deep neural network (DNN) computation by using the computing device, the computing apparatus comprising:

a plurality of the computation areas;

a DNN computation execution unit acquiring input information, generating a plurality of input feature maps from the input information, transmitting the generated plurality of input feature maps to the computing device to be used in the computation among the computing devices, and performing computation of the DNN model on the plurality of input feature maps in parallel by using the plurality of computation area, and calculating output information including the accuracy value of the computation result as the computation result of the DNN model; and a model adjustment unit determining applicability of the DNN model based on the accuracy value included in the output information and information on the computation scale of the DNN model and calculating model level information specifying the DNN model and the number of computation areas to be used in the DNN calculation for the plurality of input feature maps generated from the input information to be input next, wherein the DNN computation execution unit changes the DNN model and the number of computation areas to be used in the DNN computation for the plurality of input feature maps generated from the input information to be input next based on the model level information calculated by the model adjustment unit.

13. The computing apparatus according to claim 12, wherein the model adjustment unit compares magnitudes among the accuracy value, a first threshold value, and a second threshold value, when the accuracy value being larger than the first threshold, calculates model level information specifying the DNN model and the number of computation areas having smaller computation scales than the DNN model and the number of computation areas for the plurality of input feature maps, when the accuracy value being the first threshold value or less and the accuracy value being larger than the second threshold, calculates model level information specifying the DNN model and the number of computation areas for the plurality of input feature maps, and when the accuracy value being the second threshold or less, calculates model level information specifying the DNN model and the number of computation areas having larger computation scales than the DNN model and the number of computation areas for the plurality of input feature maps.

14. The computing apparatus according to claim 12, wherein a class probability value is used as the accuracy value.

15. The computing apparatus according to claim 12, further comprising a peripheral environment recognition unit performing a spatial spectrum analysis on the input information to calculate a spatial spectrum analysis result when the input information being input, and selecting the model level specifying the DNN model and the number of computation areas to be used in the computation for the plurality of input feature maps based on the calculated spatial spectrum analysis result, wherein the DNN computation execution unit uses the DNN model and the computation area set based on the model level selected by the peripheral environment recognition unit for the DNN computation for the plurality of input feature maps.

\* \* \* \* \*